(12) United States Patent
Maxwell et al.

(10) Patent No.: US 7,930,347 B2
(45) Date of Patent: Apr. 19, 2011

(54) RESPONSIBLE PEER-TO-PEER (P2P) DIGITAL CONTENT DISTRIBUTION

(75) Inventors: Ian Andrew Maxwell, Five Dock (AU); Ian Shaw Burnett, Figtree (AU)

(73) Assignee: Enikos Pty. Limited, Sydney, New South Wales (AU)

( * ) Notice: Subject to any disclaimer, the term of this patent is extended or adjusted under 35 U.S.C. 154(b) by 750 days.

(21) Appl. No.: 10/589,100

(22) PCT Filed: Feb. 10, 2005

(86) PCT No.: PCT/AU2005/000170
§ 371 (c)(1),
(2), (4) Date: Nov. 2, 2007

(87) PCT Pub. No.: WO2005/076147
PCT Pub. Date: Aug. 18, 2005

(65) Prior Publication Data
US 2008/0216106 A1    Sep. 4, 2008

Related U.S. Application Data

(60) Provisional application No. 60/542,851, filed on Feb. 10, 2004.

(30) Foreign Application Priority Data

Feb. 10, 2004    (AU) ................................ 2004900640

(51) Int. Cl.
*G06F 15/16*    (2006.01)
(52) U.S. Cl. ........ 709/205; 709/202; 709/204; 709/217; 709/226; 709/229

(58) Field of Classification Search .................. 709/205, 709/226, 202, 204, 217, 229
See application file for complete search history.

(56) References Cited

U.S. PATENT DOCUMENTS 6,389,541 B1    5/2002   Patterson
7,441,180 B1 *  10/2008  Kaczmarek et al. .......... 715/201
(Continued)

FOREIGN PATENT DOCUMENTS

EP    12201773 A1    7/2002
(Continued)

OTHER PUBLICATIONS

International Search Report dated Apr. 7, 2005.
(Continued)

*Primary Examiner* — Liangche A Wang
(74) *Attorney, Agent, or Firm* — Nixon & Vanderhye PC

(57) ABSTRACT

A content distribution system, including: a registration module for receiving registration data for a digital item accessible, on a communications network such as a peer to peer (P2P) network, using a digital item client, such as a P2P client, on a first device; an activity module for receiving a request for content of the digital item from the client on a second device; and a transaction module for registering download of the content to the second device, for processing payment transactions with the second device, and for processing remuneration transactions with at least the first device. The system also has a search module for receiving queries for digital items and ranking results based on a user selected ranking criteria including at least one of: review of said digital items; use of said digital items; and purchase of said digital items. The digital item and a declaration for the item may comply with MPEG-21.

18 Claims, 33 Drawing Sheets

U.S. PATENT DOCUMENTS

| | | |
|---|---|---|
| 2001/0025255 A1 | 9/2001 | Gaudina |
| 2002/0062290 A1* | 5/2002 | Ricci ........................... 705/59 |
| 2004/0167857 A1 | 8/2004 | Baker et al. |
| 2004/0205027 A1 | 10/2004 | Vidor |
| 2005/0027821 A1* | 2/2005 | Alexander et al. ............ 709/218 |
| 2006/0004600 A1* | 1/2006 | Summer et al. .................... 705/1 |
| 2008/0034064 A1* | 2/2008 | Choi et al. .................... 709/219 |
| 2009/0055282 A1* | 2/2009 | Ondeck ............................ 705/26 |
| 2009/0216644 A1* | 8/2009 | Summer et al. ................. 705/14 |

FOREIGN PATENT DOCUMENTS

| | | |
|---|---|---|
| EP | 1347617 A2 * | 9/2003 |
| WO | WO 99/45487 | 9/1999 |
| WO | WO 00/39733 | 7/2000 |
| WO | WO 00/43892 | 7/2000 |
| WO | WO 00/65448 | 11/2000 |
| WO | WO 01/04803 A1 | 1/2001 |
| WO | WO 01/55881 A2 | 8/2001 |
| WO | WO 01/88819 A1 | 11/2001 |

OTHER PUBLICATIONS

"DigitalContainers", Digital Rights Management, Content Security and E-commerce for Peer to Peer Networking. http://www.swapbucks.com/faq.php, Sep. 2, 2004, SWAPBUCKS™.

* cited by examiner

Figure 21 enikos
the power of 21 my reviews

Total Author Rating = XX%

| | | | album review | most played | most bought | mixed salad |
|---|---|---|---|---|---|---|
| Collection Name | No of Rev | Date Created My Stuff Bought? etc | 43% | 34% | 12% | 31% |
| Collection Name | No of Rev | Date Created My Stuff Bought? etc | 43% | 34% | 12% | 31% |
| Collection Name | No of Rev | Date Created My Stuff Bought? etc | 43% | 34% | 12% | 31% | format | preview | status | add | edit return

Figure 23

RESPONSIBLE PEER-TO-PEER (P2P) DIGITAL CONTENT DISTRIBUTION

RELATED APPLICATIONS

This application claims priority benefit of U.S. provisional application 60/542,851 filed Feb. 10, 2004 and is a U.S. national phase of PCT/AU2005/000170 filed Feb. 10, 2005. This application also claims priority rights from Australian patent application 2004900640 filed Feb. 10, 2004.

TECHNICAL FIELD

The present invention relates to a content distribution system, and more specifically to a system for facilitating the distribution of content using peer to peer networks.

BACKGROUND

The growth of peer to peer (P2P) networks and their use for distributing content, such as music, video and graphic files, has been considerable in recent years. P2P networks allow each computer on the network to equally share its resources, and each computer can act as both a server and a client. P2P networks do not generally require a centralised server, that may act as a resource sharer or file server, and typically no computer has more control over the network than any other. Whilst it is difficult to administer and monitor activity on such networks, they have the advantage that users are generally free to trade content files without reference to any administration or authority system. The networks are established by each of the participating computers running a P2P client, such as the Morpheus (http://www.morpheus.com), Limeware (http://www.limeware.com), BearShare (http://www.bearshare.com), Kazaa (http://www.kazaa.com), and Grokster (http://www.grokster.com) clients, for the respective networks of the same name. The clients all use a P2P protocol, such as Gnutella (http://www.gnutella.com), to establish connections to the P2P network, normally using TCP/IP and IP connections to the Internet.

Whilst the P2P networks are popular for content distribution, they have also been widely criticised for facilitating the distribution of content, particularly music and films, without the authority of the owners or licensees of the copyright in that content, and more particularly without any benefit returning to the owner or creator of the content. The P2P networks have therefore been derided as being networks for trading unauthorised or pirate content, and participants have been the subject of extensive litigation by content owners and publishers (http://www.P2Punited.org, http://www.riaa.org, http://www.mpaa.org).

In view of the above, it is desired to provide at least a useful alternative or a content distribution system that encourages decentralised content distribution and also provides a process whereby participating parties and content owners and creators can be remunerated.

SUMMARY

In accordance with the present exemplary embodiment, there is provided a content distribution system, including:
 a registration module for receiving registration data for a digital item accessible, on a communications network, using a digital item client on a first device;
 an activity module for receiving a request for content of said digital item from said client on a second device; and
 a transaction module for registering download of said content to said second device, for processing payment transactions with said second device, and for processing remuneration transactions with at least said first device.

A digital item, as referred to herein, is a digital object having a structure, metadata and resources. Digital items may be declared in a Digital Item Declaration (DID) using a Digital Item Declaration Language (DIDL), as specified by the MPEG standard ISO21000-2, however, it will be appreciated the invention is not limited to a digital item defined by such a DIDL and other definitions are equally applicable. It should be noted that a DID, while normally an integral part of a digital item, can be transferred independently between parties to disclose the structure, metadata and resources of a given digital item.

The present exemplary embodiment also provides a content distribution process, including:
 receiving registration data for a digital item accessible, on a communications network, using a digital item client on a first device;
 receiving a request for content of said digital item from said client on a second device;
 registering download of said content to said second device;
 processing payment transactions with said second device; and
 processing remuneration transactions with at least said first device.

The present exemplary embodiment also provides a content distribution system including a search module for receiving queries for digital items and ranking results based on a user selected ranking criteria including at least one of:
 (i) review of said digital items;
 (ii) use of said digital items; and
 (iii) purchase of said digital items.

The present exemplary embodiment also provides a P2P client including a search interface for submitting queries for digital items and selecting a result ranking criteria based on at least one of:
 (i) review of said digital items;
 (ii) use of said digital items; and
 (iii) purchase of said digital items.

The present exemplary embodiment also provides a content distribution system, including:
 means for referencing a digital item accessible, over a communications network, using a digital item client on a device, wherein complete content of said digital item is accessible, without payment using said client; and
 means for processing payment transactions with said client to enable said client to download said content to said device.

The present exemplary embodiment also provides a content distribution system including a search module for receiving queries for digital items, obtaining results ranked based on different search criteria, and returning said results to a device of a user based on a weighted combination of said criteria.

BRIEF DESCRIPTION OF THE DRAWINGS

Preferred embodiments of the present invention are hereinafter described, by way of example only, with reference to the accompanying drawings, wherein:

FIGS. 19 to 24 are diagrams of interfaces generated by a second embodiment of a P2P client of the system.

DETAILED DESCRIPTION OF PREFERRED EMBODIMENTS OF THE INVENTION

Figure 1:
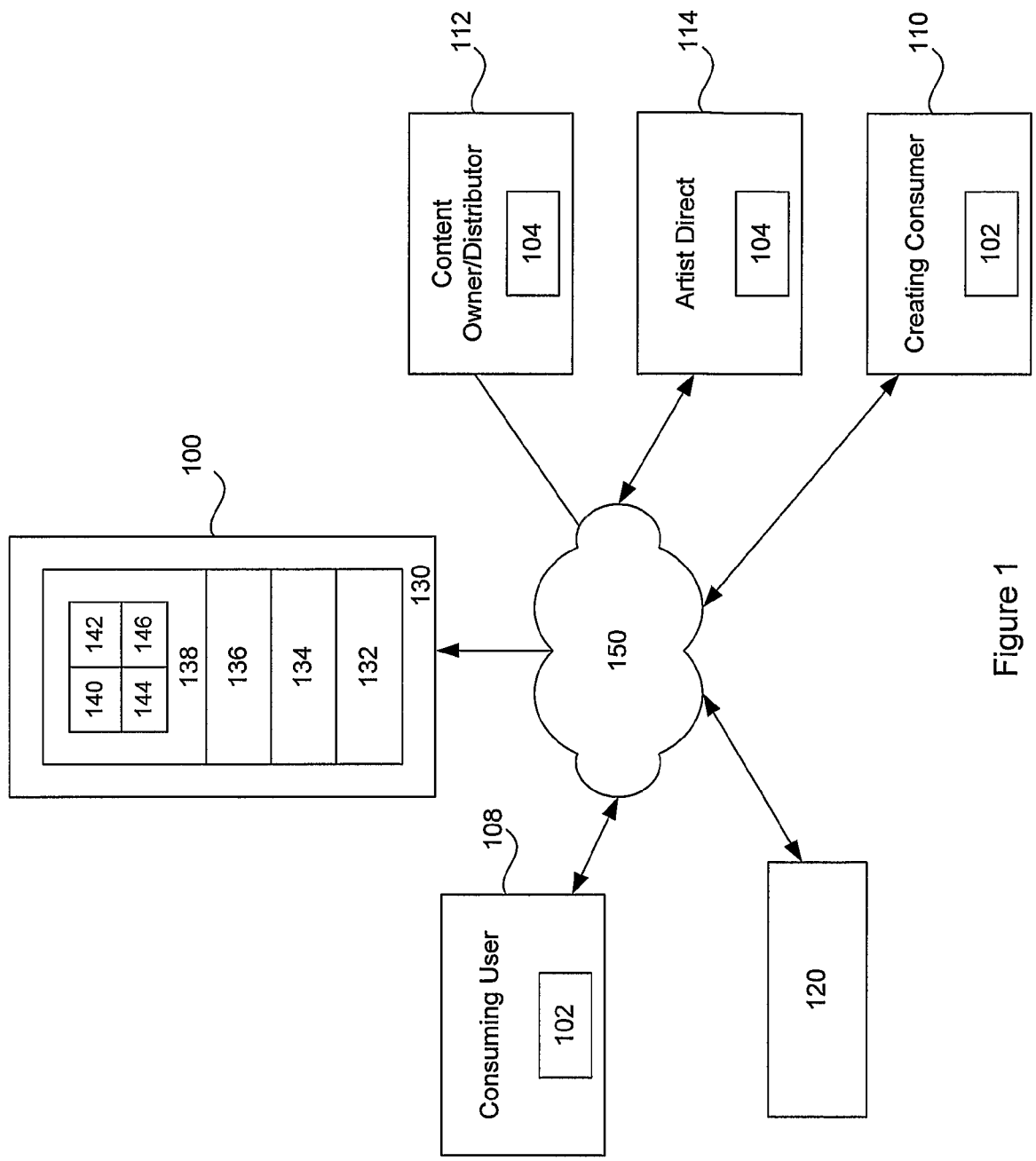
FIG. 1 is a block diagram of a preferred embodiment of a content distribution system.

A content distribution system, as shown in FIG. 1, includes a content control system 100 that operates with peer to peer (P2P) clients 102 and 104. The control system 100 includes a web server 134, such as Apache (http://www.apache.org), a number of modules 138 provided by software in languages such as Java (http://www.java.sun.com) and Perl (http://www.perl.org), and a database server 136 provided using software such as MySQL4 (http://www.mysql.org), which are all run on the Linux OS 132 (http://www.linux.org) on a standard personal computer 130 (http://www.ibm.com). The modules 138 include a registration module 140, an activity module 142, a transaction module 144 and a search module 146. Using the modules 138, and the other components 130, 132, 134 and 136, the control system 100 provides a web site and a search engine, and executes a content distribution control process. The web site can be accessed by the clients 102 and 104 and standard web browsers (such as Microsoft Explorer). As will be understood by those skilled in the art, the components of the control system 100 can also be placed on a number of distributed computers connected by a communications network 150, and the processes executed by the components and modules can also be executed at least in part by dedicated hardware circuits, eg ASICs.

The P2P client 102 includes a standard P2P client, such as the client provided by Shareaza, KaZaA, Slyck, iMesh, Emule, or eDonkey, but supports several of the existing P2P networks, ie Gnutella, eDonkey, and KaZaA. In another embodiment the client supports only a specialised P2P network for a category of P2P clients or a subset thereof, and the subset may be defined by client users or by the distributors of content. The P2P client also includes additional software classes that allow for access and creation of digital items, in accordance with the MPEG-21 standard administered by the International Organisation for Standardisation, ie ISO 21000-2. Digital items are structured digital objects, including a standard representation and identification, and metadata. Digital items are the basic unit of transaction in the framework provided by the MPEG-21 standard. A digital item (DI) is a combination of resources, such as video, audio images etc, and metadata, such as MPEG-7 descriptors, and structure which describes the relationship between the resources. Whereas MPEG-2 and MPEG-4 cover the encoding of audio and visual content, and MPEG-7 covers metadata that describes multimedia content, MPEG-21 covers a framework for the creation, production, delivery and trade of electronic content. Digital items may be declared using the Digital Item Declaration Language (DIDL), typically a DIDL specified by the MPEG-21 standard (ISO21000-2), in a digital item declaration (DID). However, it will be appreciated the invention is not limited to digital item defined by such a DIDL and other definitions using XML or other languages and formats are equally applicable. While digital items may be delivered or stored as a single package they are generally a 'virtual' container. A user may receive only a digital item declaration (written in Digital Item Declaration Language) for the digital item. Content and metadata may be accessed by reference from the digital item declaration.

The P2P client 102 includes a P2P network interface, a web browser interface, a library interface that allows the archival and "drag and drop" management of a user's content files, and a search module or facility that provides standard web searching, P2P network searching and P2P downloads, particularly P2P downloads that involve the content control system 100. The P2P client 102 includes digital item creation code that provides an interface that allows content files, such as audio, video, image and text files, to be dragged and dropped from the operating system desktop or other software applications into a container that represents the digital item. Other means of creating Digital Items may also be incorporated e.g using menus and file browsing, text editing of the Digital Item Declaration, and automatic creation of DIs using 'Wizard' interfaces. The metadata for the digital item can be customised and includes digital item identification (DII). The digital item creation interface includes an editor window and an add window that allows content elements to be selected, adjusted and placed within the digital item. Content-sensitive pop-up menus are included to add new elements to the digital item, set attribute values, set the text content of a statement element, and specify the content resource reference by a resource element. Content resources, such as audio and video files, may be included within a digital item or simply referenced by the item.

Once created, the digital item can be validated by parsing and validating its DID, against the standard ISO 21000-2 on demand, and saved. The content referenced by the digital item may be unauthorised content ripped from other storage media, such as CDs or DVDs, or may be content that is original and authored by the user of the client 102. The content may also be content that the user has an authority to publish from the content owner. The P2P client 102 can therefore be used on computer systems of consumers of content 108, creators of content 110 (who may also consume content), artists or content authors 112, and publishers 114. The computer systems 108, 110, 112, 114 required to run the P2P client 102 are standard computer systems, such as a personal computer (http://www.ibm.com) running the Linux OS (http://www.linux.org) or Microsoft Windows. The P2P client is written in Java, but could also be written in C++ or a number of other software languages.

The P2P client 102 may be substituted by an advanced version of the client that includes additional features, such as enhanced interfaces, with the ability to create digital items that operate across multiple clients, and digital rights management (DRM) capabilities. The advanced client may also include a web server to allow P2P users to see a collection of digital items created by the user. Music mixing and sampling software can also be incorporated or referenced in the advanced client.

Content owners, publishers and distributors, and content authors, such as artists, are able to use on their computer systems 112 and 114 a digital item creator module 104 that includes all of the digital item creation software tools forming a creator module of the advanced P2P client, and allows the digital item to be placed on the P2P networks and registered with the content control system 100, but does not include other aspects of the P2P client.

Figure 2:
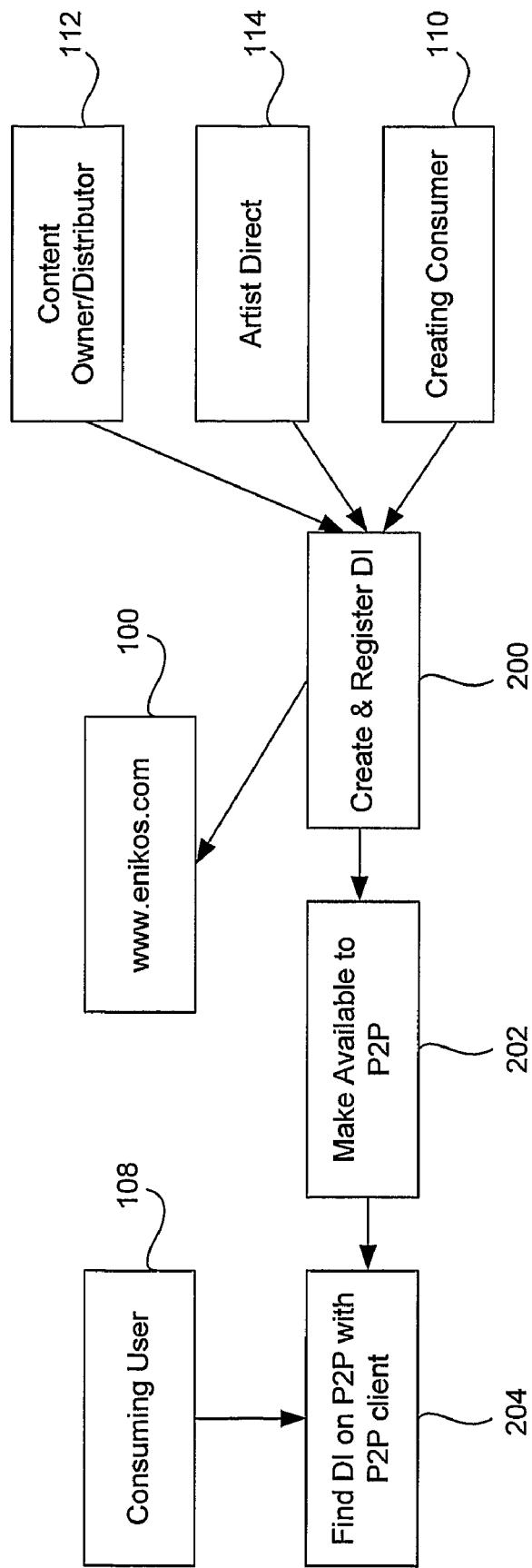
FIG. 2 is a message flow diagram of a digital item registration process of the system.

The digital item creation tools (ie the creator module) of the P2P client 102 and the creator client 104, allow a digital item, once it has been created, to be registered with the control system 100, as shown in FIG. 2. The control system 100 includes the control web site (e.g. http://www.enikos.com). The registration process of FIG. 2 is defined by and performed under the control of the registration module 140. Once registered with the control system 100, at step 200, the digital item or only the digital item declaration or parts of the digital item is made available, at step 202, on the P2P networks that the P2P client supports, by storing it in a searchable folder hosted on the creator's or author's system 110, 112 or 114. The digital item is created with purchase metadata for a number of content control buttons, and in particular at least one 'buy' button, eg buy album, buy track, or a direct reference to a buy button in a third party site (eg www.amazon.com). A consuming user 108 that locates the digital item on the P2P network with the P2P client 102, at step 204, is able to access content of the digital item and use it, subject to any restrictions placed on the referenced content. For example, some music tracks may be played in an unrestricted manner, whereas other music tracks may only be allowed to be played for a few days, before the track has to be purchased. The P2P interface of the P2P client 102 shows the different types of content referenced by digital items and the extent to which there are restrictions placed on the different types of content, eg free or ripped content can be displayed separately from other content that needs to be purchased. Any buy buttons are generated as part of the P2P interface on the basis of the purchase metadata for pay content.

In one version of the P2P client, as described in the embodiments below, a user may freely access the content, such as in an audio or video stream, without payment, but is not able to acquire the content, ie download and persistently store the content, unless the content is purchased using a respective buy button for the content. For this version of the P2P client 102, the user is able to enjoy free content on demand, in a similar fashion to broadcast radio or TV, but is also provided with a facility to purchase a copy of the content for subsequent use as desired and, for example, transfer to other devices.

Figure 3:
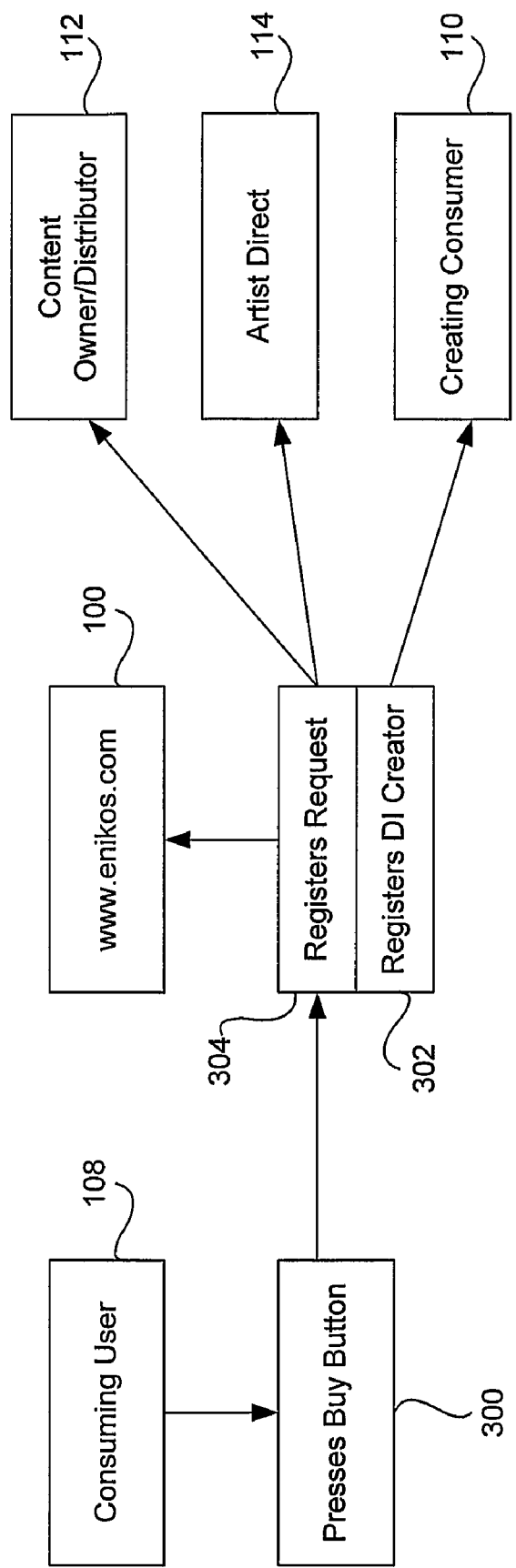
FIG. 3 is a diagram of a purchase request process of the registration system.
Figure 4:
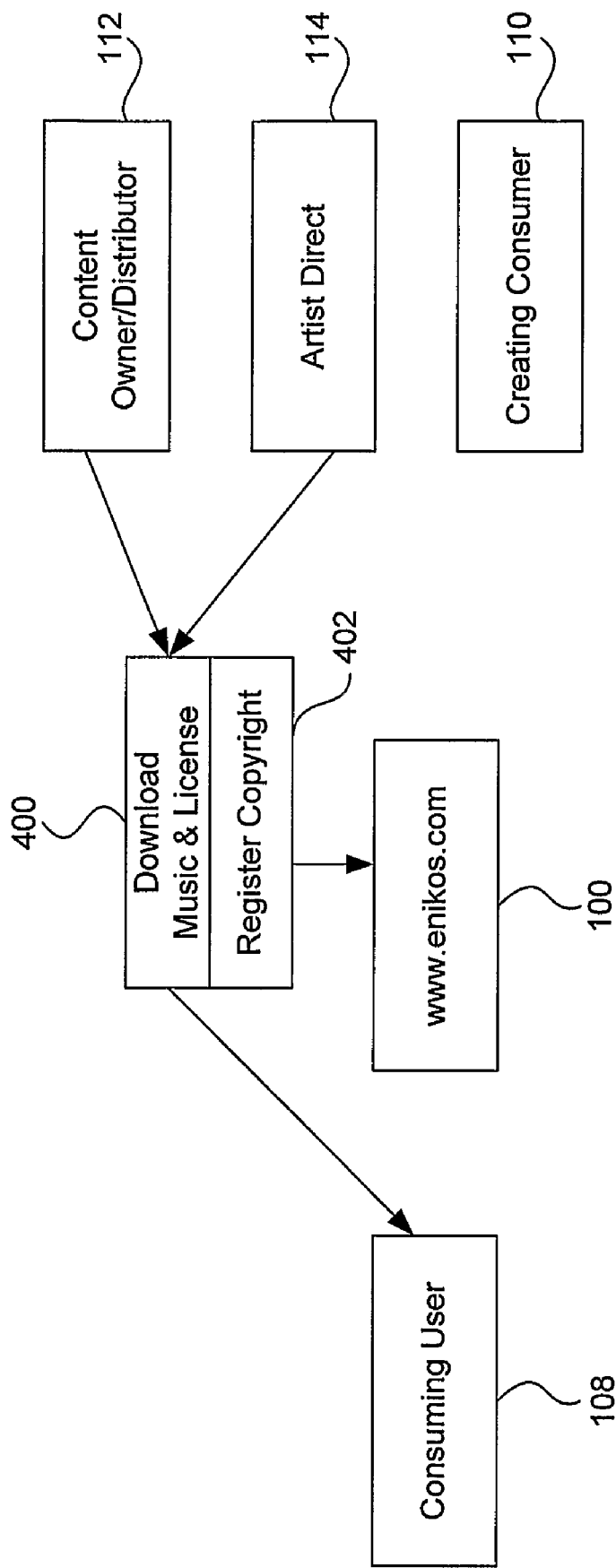
FIG. 4 is a flow diagram of a download monitoring process of the system.

When a consumer selects the buy button, as shown in FIG. 3 at step 300, the P2P client 102 passes a request back to the creator of the digital item 110 to 114 for the content, at step 302, and the request is registered with the control system 100, at step 304. The requested content is then downloaded, with associated licence data and other metadata, from the referenced host or hosts 110, 112, or 114 using the P2P client 102 or the DI creator module 104, at step 400, as shown in FIG. 4. The content is downloaded directly to the P2P client 102 of the consumer's system 108. At step 402, the download is registered, together with any copyright information in the content control system 100. Communication with the control system 100 to access and use a digital item, in particular the access process of FIGS. 2, 3 and 4, is defined by and performed under the control of the activity module 142.

Figure 5:
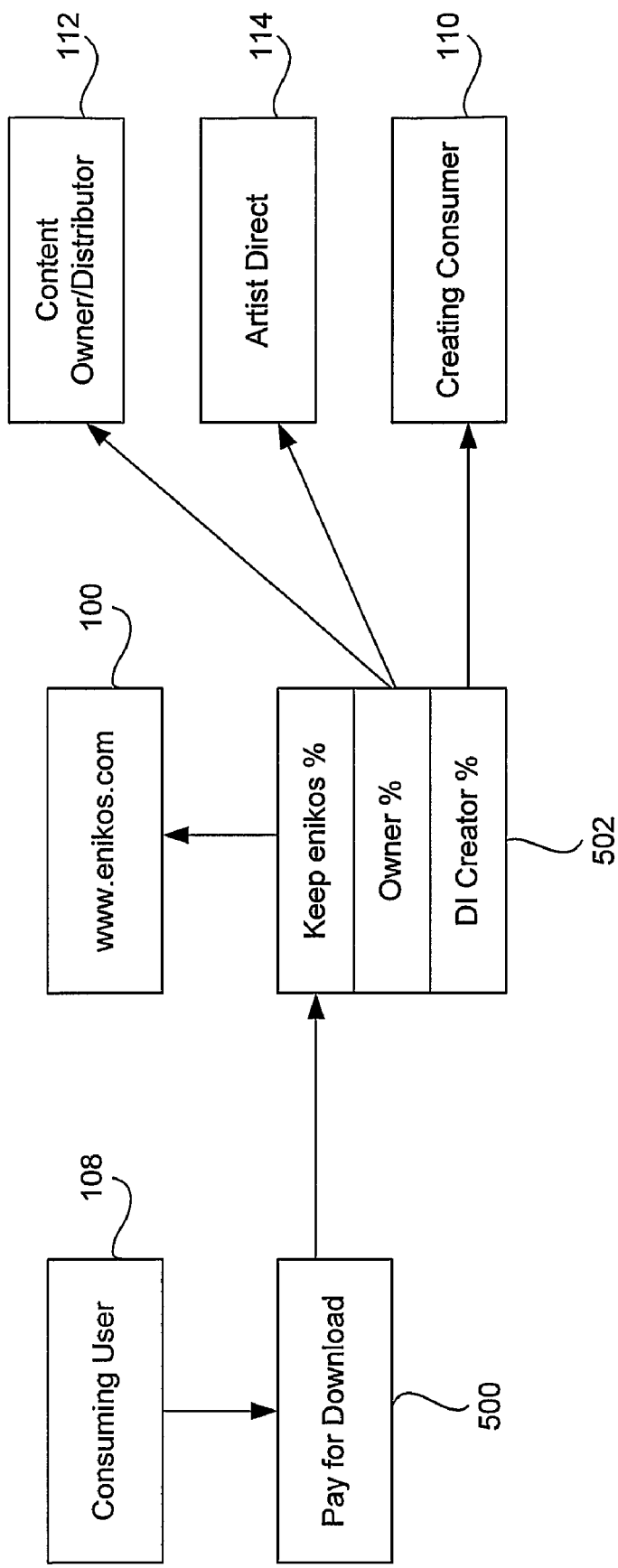
FIG. 5 is a diagram of a payment and remuneration process of the system.

On receiving the requested content of the digital item, the consuming user 108 then executes payment transactions to pay for the download and release the content, at step 500 shown in FIG. 5. The release of the content is typically accomplished by sending a decryption key to the user as a fulfillment of the grant of a license for the content. The mechanisms of the release of the content on the basis of a license may follow one of the many Digital Rights Management mechanisms allowing secure delivery of content, eg Microsoft's Windows Media DRM or Intertrust's DRM solutions. The content control system 100 controls the payment transactions to ensure payment is received and provides certificates, licenses and keys as appropriate to allow the requested content to be freely used by the user 108. The payment processes of FIG. 5 are defined by and performed under the control of the transaction module 144.

Once payment has been received, the control system 100, on the basis of rights expressions, licenses, or other metadata information contained in the registered digital item executes remuneration transactions with at least one of the systems 110 to 114 to control the distribution of remuneration to the various parties involved in the content distribution system. For example, at step 502, a percentage of the payment amount is kept by the operator of the control system 100, a percentage is passed to the owner of the content, such as a music publisher, and a percentage is passed to the creator of the content, such as an artist 114 or creating consumer 110. Payment and remuneration can be exchanged in a variety of forms. For example a direct monetary payment can be made to content owners and distributors 112, and credit accounts can be maintained by the control system 100 for creating consumers 110, the accounts having data representing credits for purchases of other content.

As mentioned above, the digital items may include unauthorised, unlicensed or ripped content, but in each case when a digital item is created the creation tool includes an option to add a legitimate licensed copy of the content, or at least a reference to such a legitimate copy. Users are encouraged to create the digital items with legitimate content because they are paid if they generate a DI, sign it, register it, include buy buttons for legitimate content, and another party requests the content using the buy buttons. They will receive a percentage payment if the content is bought, either from the operator of the control system or the content owner. Payment can be in the form of credits held and maintained by the content control system 100, which have the benefit of being traded on the system 100 for subsequent purchases, and on other systems, such as Amazon (http://www.amazon.com) and eBay (http://www.ebay.com), for other purchases, or redeemed as cash, or used in any of numerous barter systems now available on the Internet The search engine of the content system 100 returns search results for registered digital items. The search engine is defined by and executed under the control of the search module 144, and is accessible by the web site of the system 100 and by the P2P interface of the client 102, using the search module of the client. Creating users 108 who are successful, and accumulate a number of credits and/or give rise to a number of purchases of legitimate content, derive a further benefit in that the ranking for their digital items can be ranked higher in search results returned by the search engine. The ranking can be determined on the basis of the credits and/or successful sales of content generated by a user 110, and/or reviews by consumers of the digital items and their creators. As users of the P2P client 102 can be consuming and creating users, this assists with distribution and creation of the digital items. Highest ranked users are also able to sub-licence their search engine ranking to other users.

The content referenced in the digital items created by the users 110 to 114 is able to be identified because users include identifiers in the DID of a digital item in order to receive possible remuneration.

Figure 6:
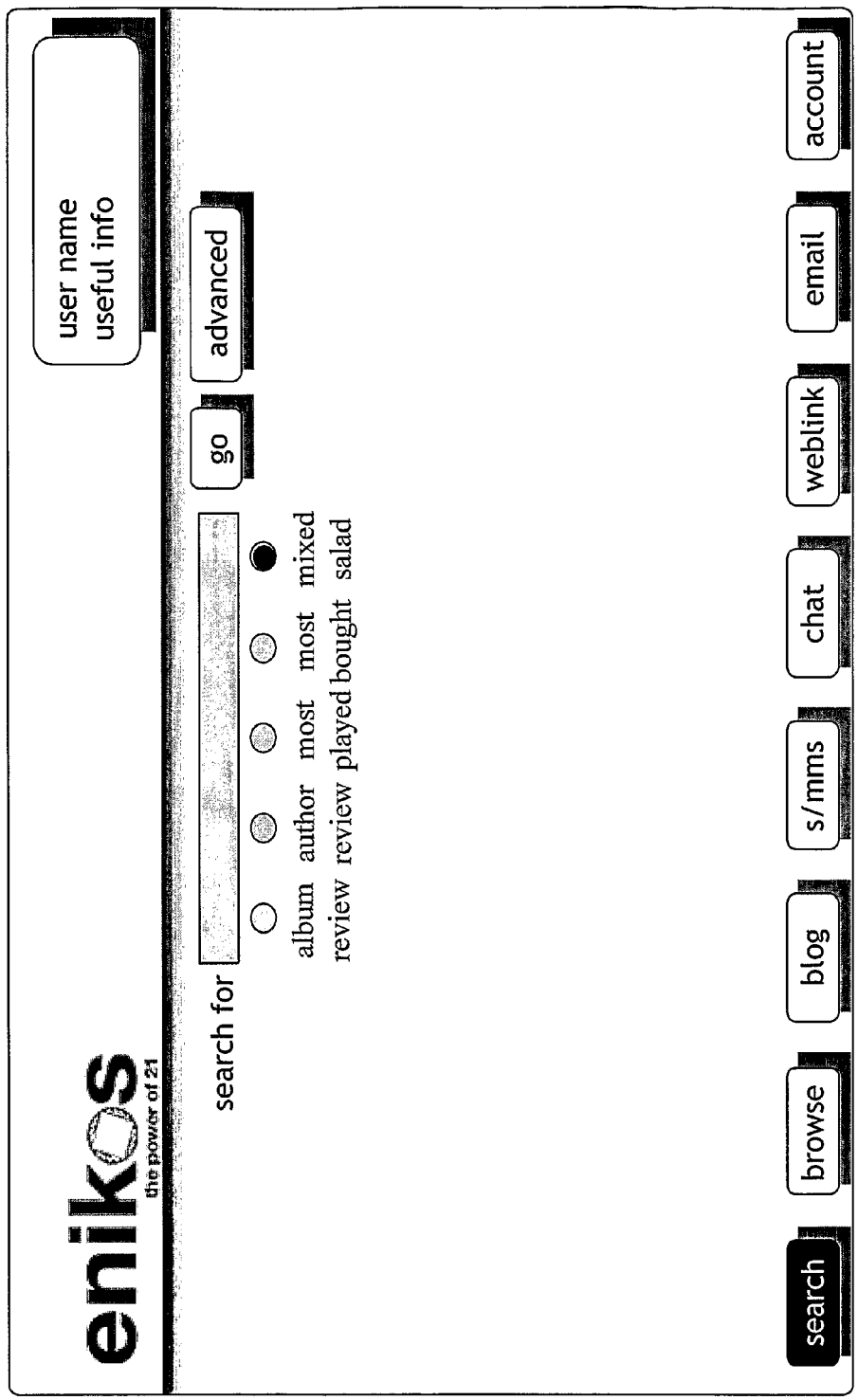
FIGS. 6 to 18 are diagrams of interfaces generated by a first embodiment of a P2P client of the system.
Figure 7:
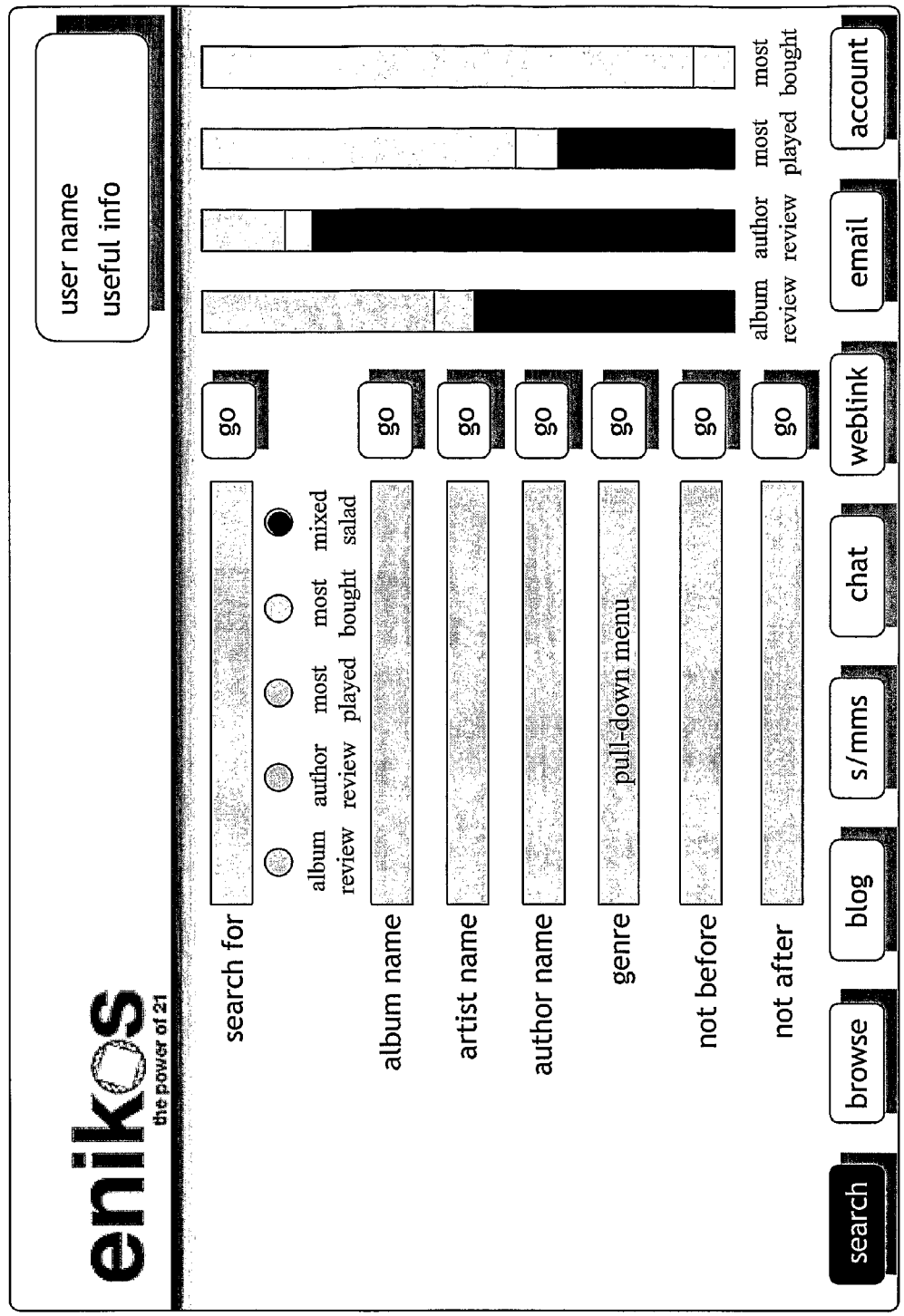
Figure 8:
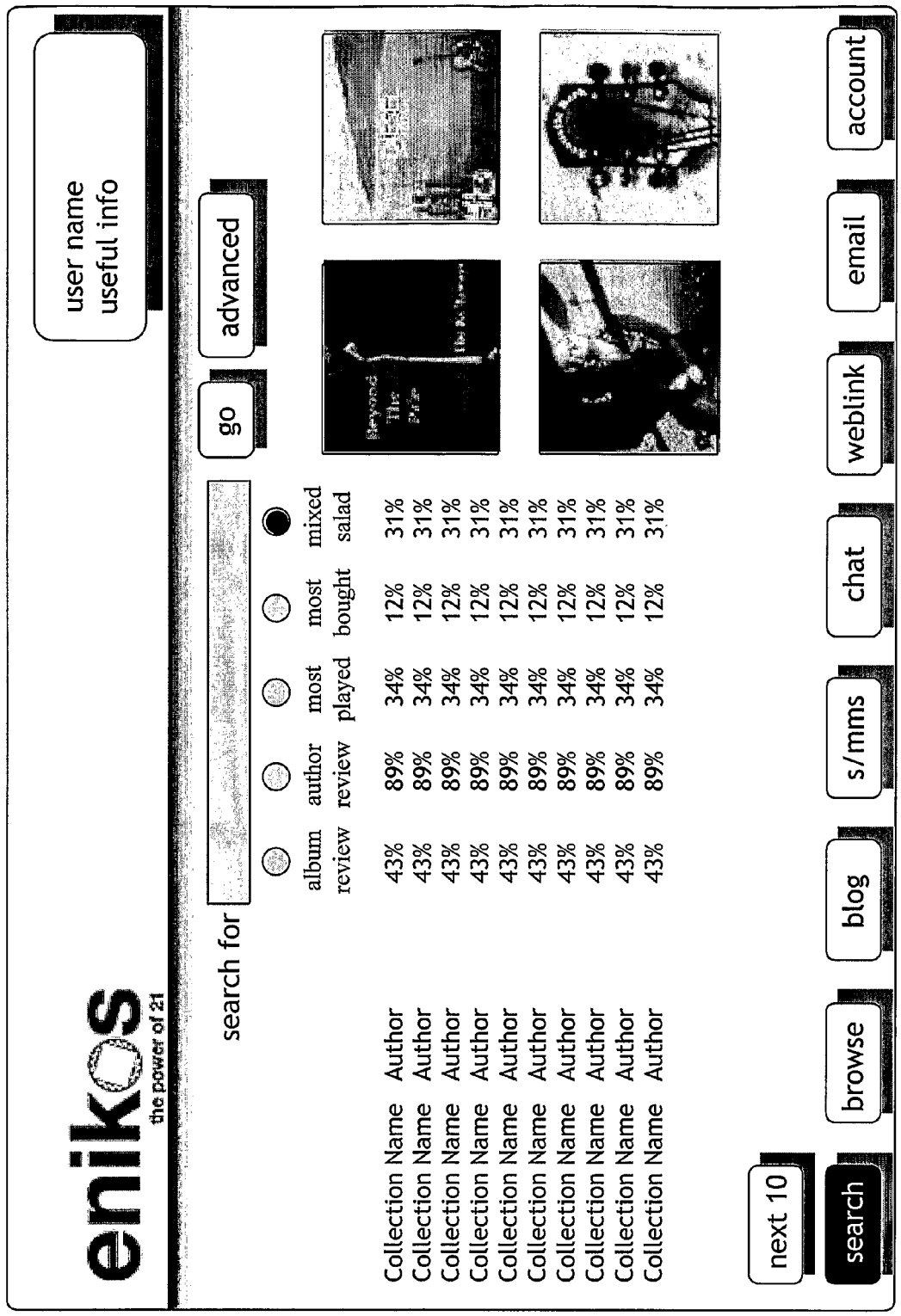

The user interfaces, generated by an embodiment of the P2P client 102 for a computer user 108, are shown in FIGS. 6 to 18. The embodiment, as will be apparent, is directed specifically to music content. A series of access buttons, eg search, browse, blog etc, are generated at the bottom of each of the interfaces to provide access to different parts of the client 102. Selecting the search button provides access to a simple search interface for the search engine, as shown in FIG. 6. This provides for the entry of query terms, and allows a user to select how the search results will be ranked, ie on the basis of album review level, author review level, most played, most bought or a "mixed salad" that relies upon a combination of the previous four ranking level criteria or categories. Selecting an advanced button causes the generation of an advanced search interface by the client 102, as shown in FIG. 7. This allows a number of more specific search criteria to be entered, such as album name, artist name, author name, time criteria and music genre criteria. A set of sliding toolbars is also provided to allow selection of a specific ranking level that the content must possess, for each of the four ranking categories, album review, author review, most played and most bought. In this embodiment, the ranking categories are applied to all digital items registered with the content system 100, with a level being assigned either by a reviewer or on the basis of use or purchase of the content, eg for most played and most bought, respectively. The search results are presented in an interface, as shown in FIG. 8, that lists the digital items together with their respective ranking levels for each of the ranking categories. In this embodiment, the ranking levels for each ranking category are represented by percentages, with 100% representing the highest level and 0% representing the lowest level. Although only one of the ranking categories or criteria may be selected for ranking the results, the results can be returned with a display for each item showing the respective state of the ranking levels for each of the categories.

Figure 9:
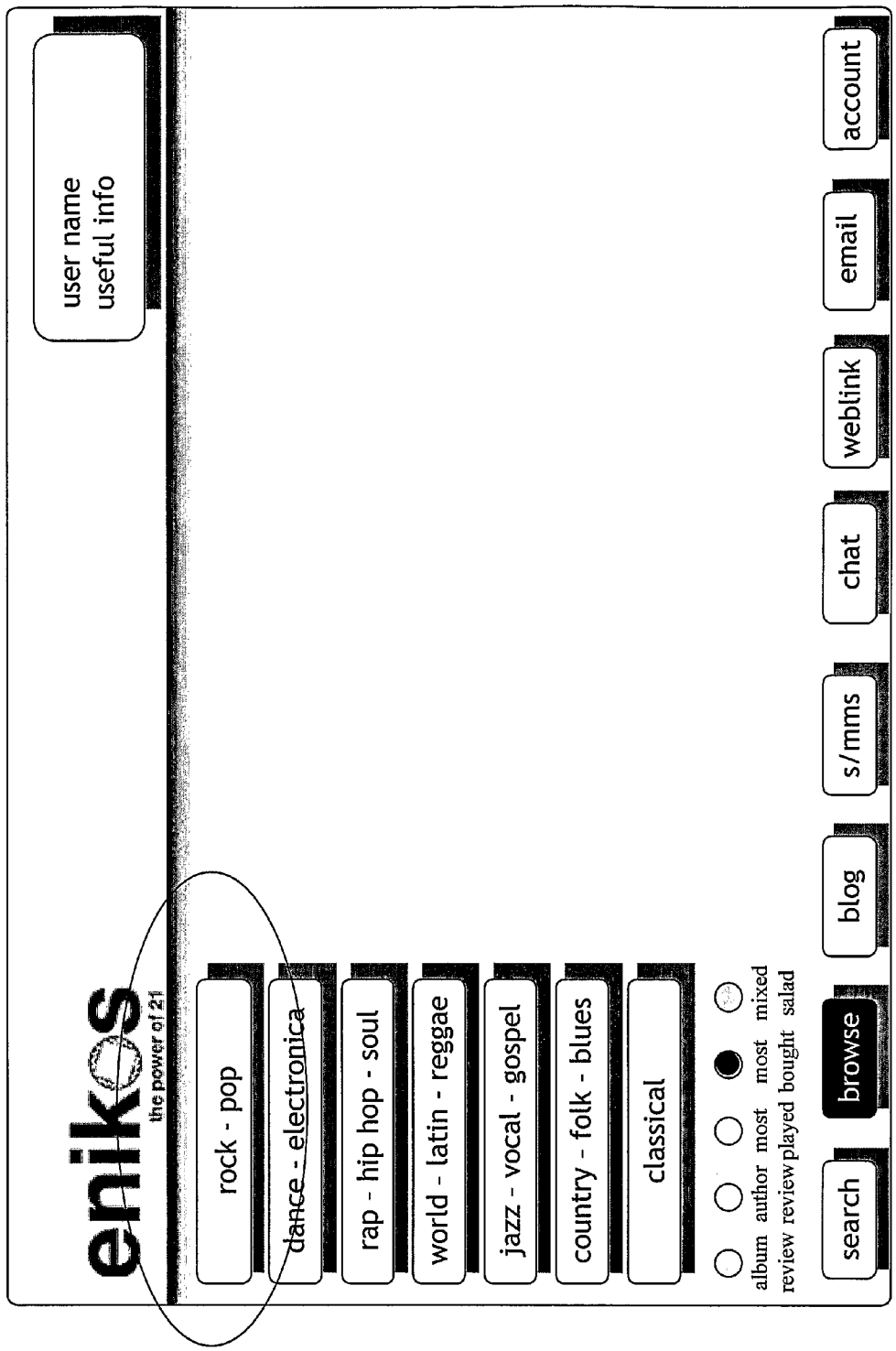
Figure 10:
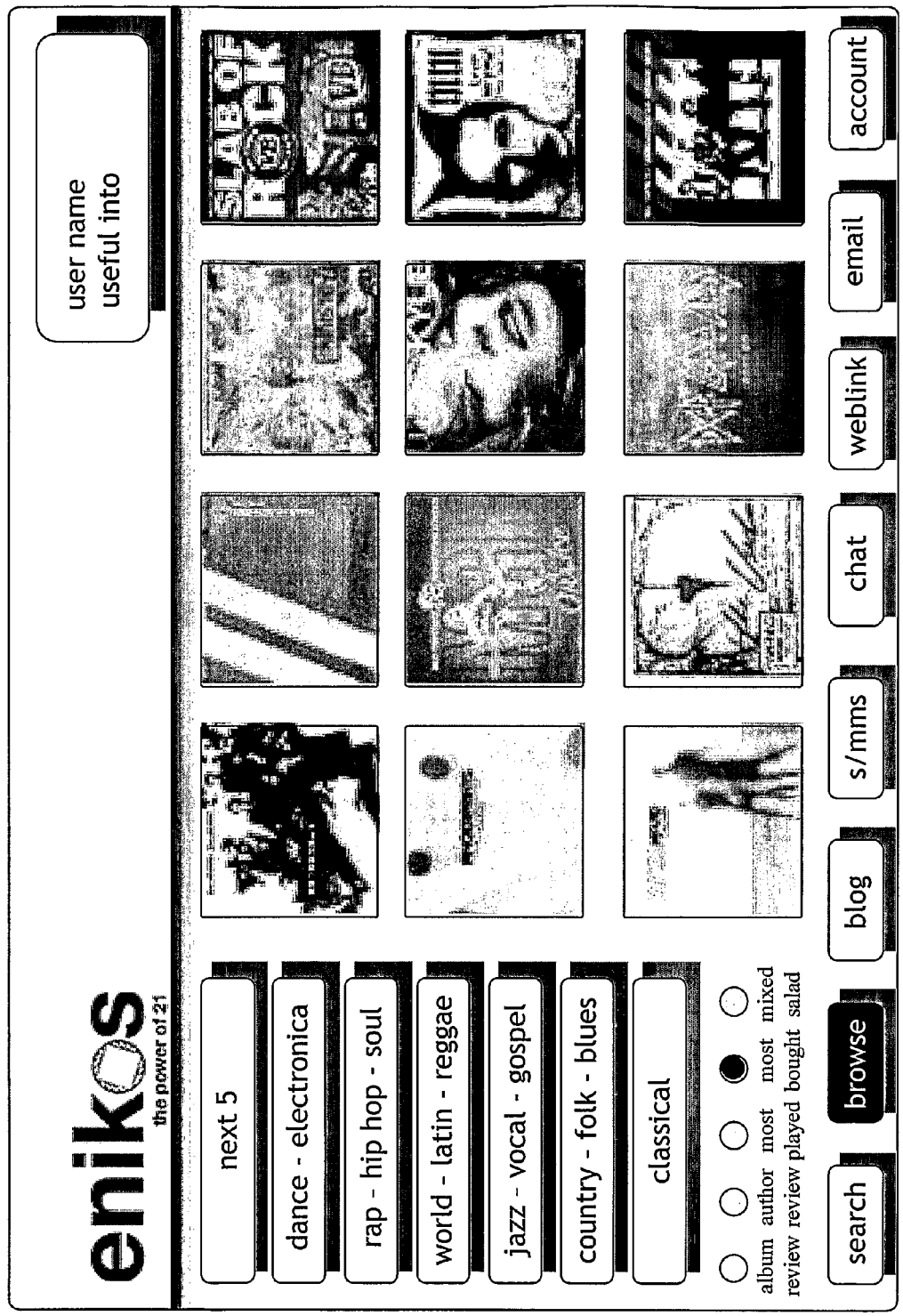
Figure 11:
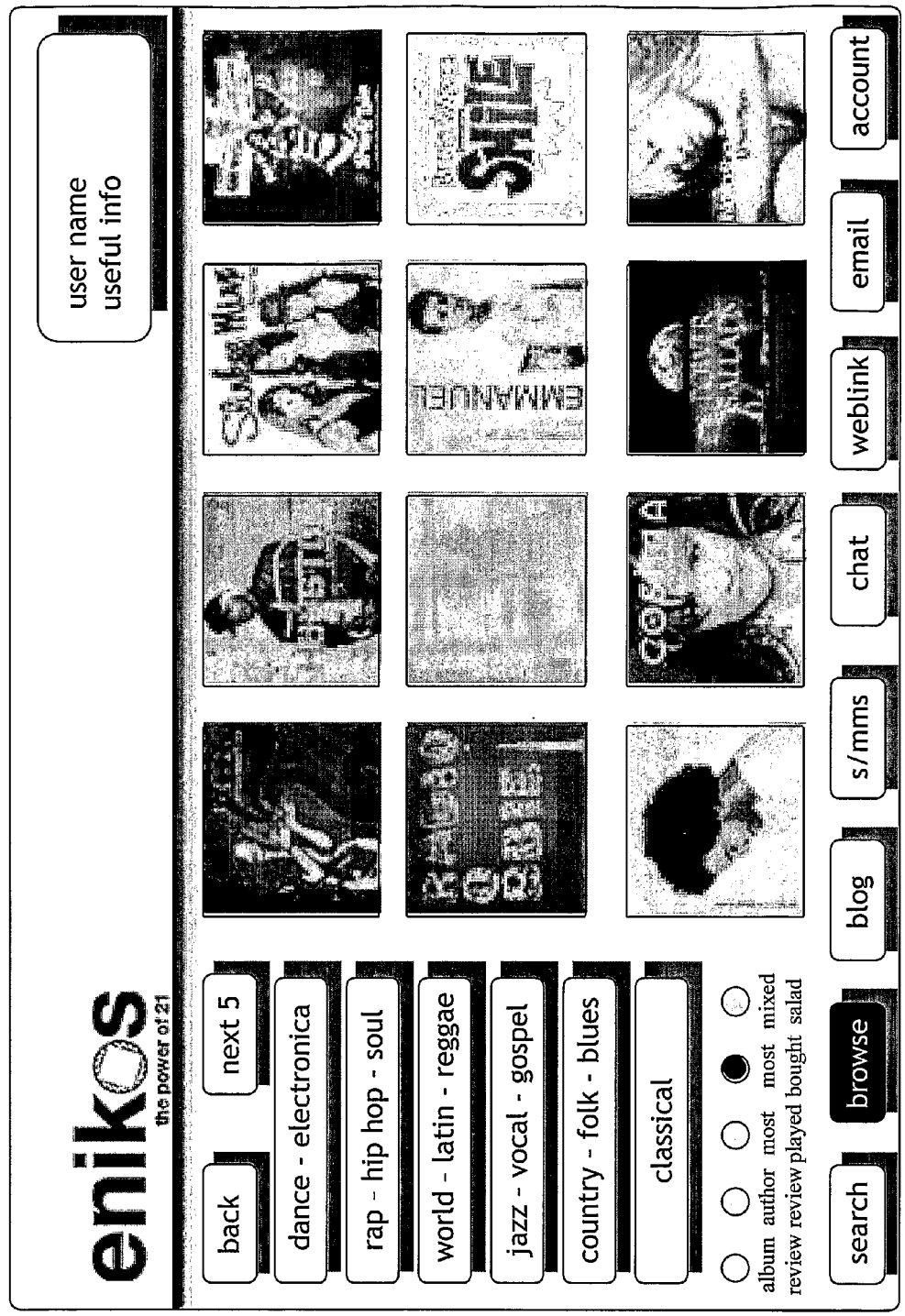

By selecting a browse access button, a browser interface, as shown in FIG. 9, is presented that allows a consumer user to browse or filter the digital items registered with the content system 100, on the basis of a selected music genre. The user can also select how the browse results are displayed, whether it should be based on one of the four ranking categories or the "mixed salad" category. The "mixed salad" category is based on a combination of the previous four ranking categories, and normally is a weighted average of the other four categories as selected by the user using a toolbar interface, as shown in FIG. 7. The search results are displayed, as shown in FIG. 10, by presenting an image representing the digital item, eg an album cover, as shown in FIGS. 10 and 11. The digital item can then be accessed by selecting one of the images presented in the results interface of FIGS. 10 and 11, as the interface provides a link (eg a HTTP link or P2P link) with each image to the respective digital item. The search engine of the system 100 returns the results for the digital items with the respective links and images. A link or reference to a digital item may simply comprise a link to the item's DID.

Figure 12:
Figure 13:
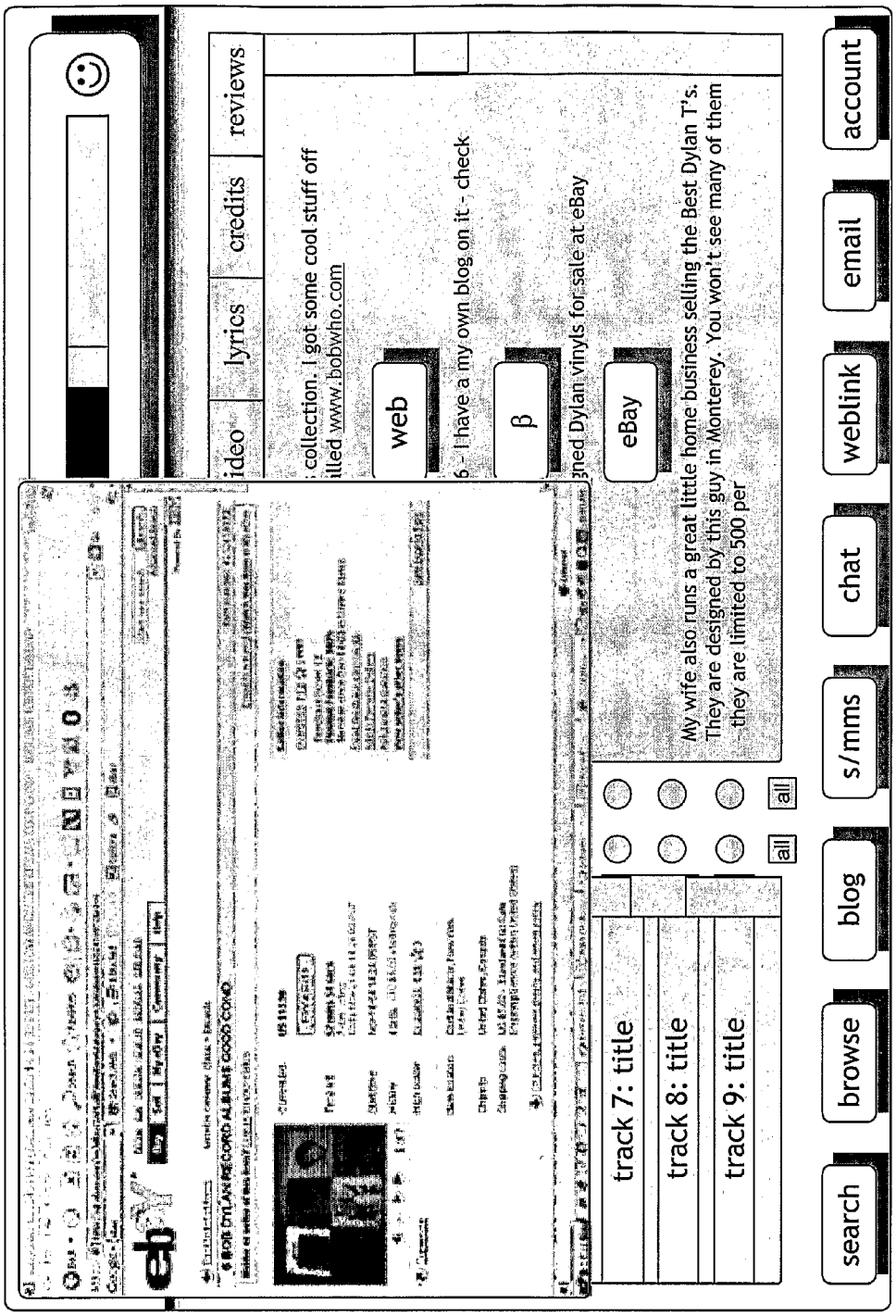
Figure 14:
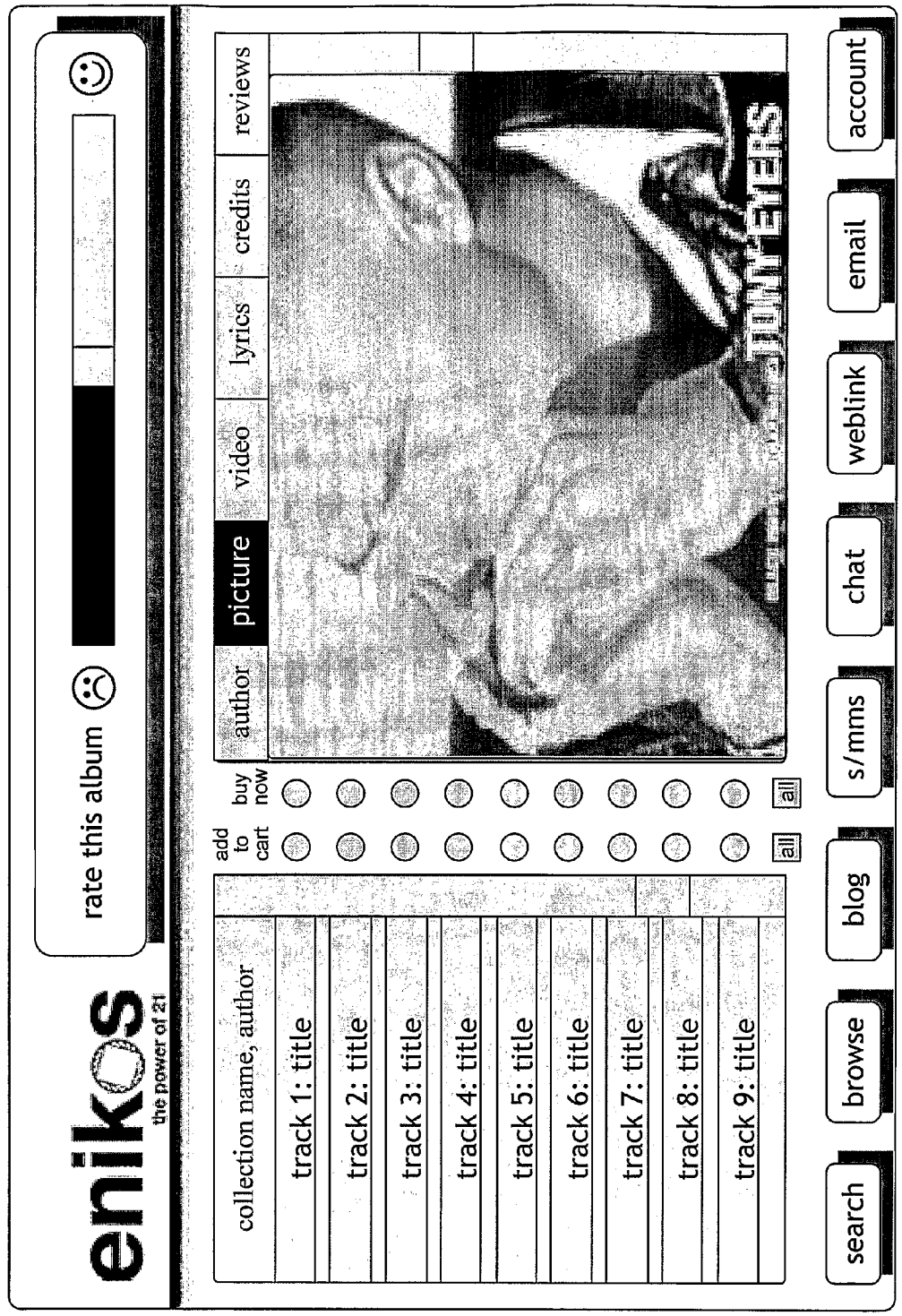
Figure 15:
Figure 16:

The content of a selected digital item is accessible and presented in a digital item access interface, as shown in FIGS. 12 to 16. As shown in FIG. 12, the music tracks of the album of the item are listed in a track selection box on the left of the interface. Any track can be selected to play. Also, one or more tracks of the album can be selectively added to a shopping cart or bought by selecting radio cart or buy buttons provided in the centre of the interface. The right of the interface provides content selection buttons for selective access to data included by the author, such as pictures loaded from the album, as shown in FIG. 14, video, lyrics, credits, reviews and author inserted links to different sites, as shown in FIGS. 12 and 13. For example, the user can insert in the digital item information for the consumer users and links to different web sites, such as fan sites and ecommerce sites, and blogs, such as those that might relate to the album. Selecting the video button in the digital item interface will cause the client 102 to play in full screen mode a video included by the author that relates to the album, as shown in FIGS. 15 and 16.

One version of the P2P client 102 is configured to receive and present targeted advertising content served by or on the basis of reference data from the content distribution system 100. The advertisements are primarily presented whilst the user is accessing, eg streaming, content for free. Consumer users are able to download this version of the P2P client 102 for free after completing a registration process, again controlled by the registration module 140, which involves providing demographic data on the user to the content distribution system 100. The activity module 142 ensures the advertising content is delivered to the user's client, at the appropriate time, based on the user's use of the client, the demographic information and historical use data maintained by the content distribution system 100, such as historical data that represents the content streamed or downloaded by the user. This allows the content system provider to use advertising revenue to recover costs associated with any free services provided to consuming users, such as provision of the client 102.

The digital item interface also includes, regardless of the part of the interface that has been accessed, a toolbar at the top of the interface that allows the digital item to be rated by the user, as shown in FIGS. 12 to 14. Once the toolbar has finished being adjusted, the rating can be submitted to the content distribution system 100. Once submitted, the ratings are used for determining the ranking level of a review category for the digital item.

Figure 17:
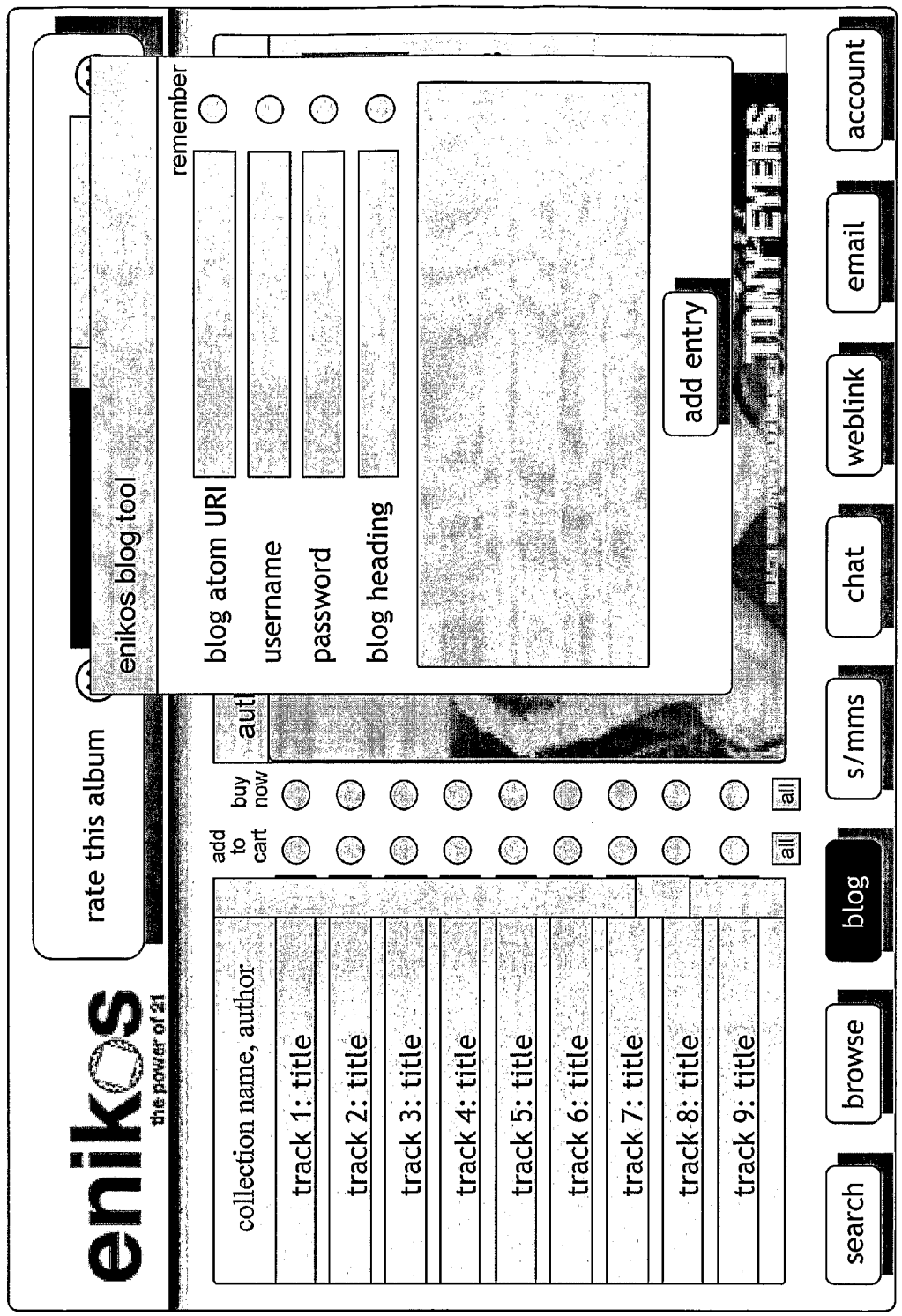

Selecting the blog access button, as shown in FIG. 17, causes the client 102 to generate a blog tool interface that allows the consumer user to make a blog entry at a URI (Universal Resource Identifier) for the location of a blog relating to a digital item or author, such as a blog for all items produced by the author.

Figure 18:
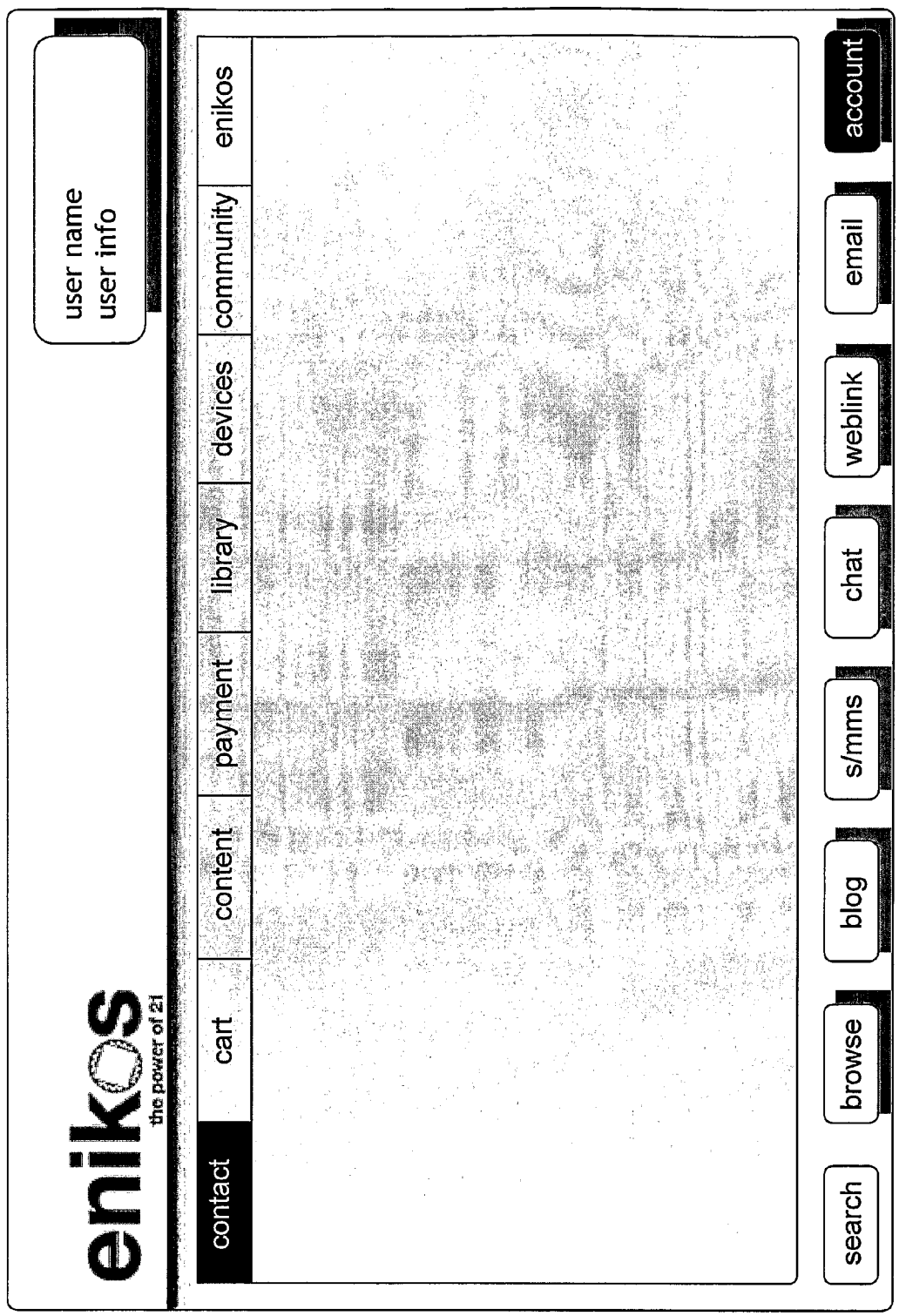

By selecting the account access button, as shown in FIG. 18, the P2P client 102 generates an interface with a series of related account buttons at the top of the interface to provide access to different account information for the user. For example, by selecting contact, the user is presented with their current contact details, including email addresses etc, which can then be adjusted and altered. By selecting cart, the user is provided access to data on tracks and albums that are currently in a shopping cart for purchase and then is provided access to additional interfaces, including buy buttons, to complete a purchase transaction and obtain information on the account balance. By selecting content, a user can set up links to their own content, such as blogs, web sites, SMS, MMS and email, provided a network based mechanism, such as a URI, is available to uniquely identify the content. The payment button provides access to interfaces that allow the users to set up different payment methods, eg by credit card or Pay Pal, and for example submit a payment to the content system provider for use of the client 102 without advertising information being presented. The library button provides access to the library interface presenting a history of a user's use of the content system, eg a history of downloaded digital items and resources. A devices button provides access to screens to manage the different devices that can be used by a user to access and use digital item resources, eg devices such as MP3 players and mobile telephones. Other settings can also be adjusted, such as where resource files, ie MP3s, are sent and stored and in what format. Selecting the community button allows the user to establish private networks between other consuming users. The final account button (enikos) provides access to web pages providing information on the content distribution system 100.

Figure 19:
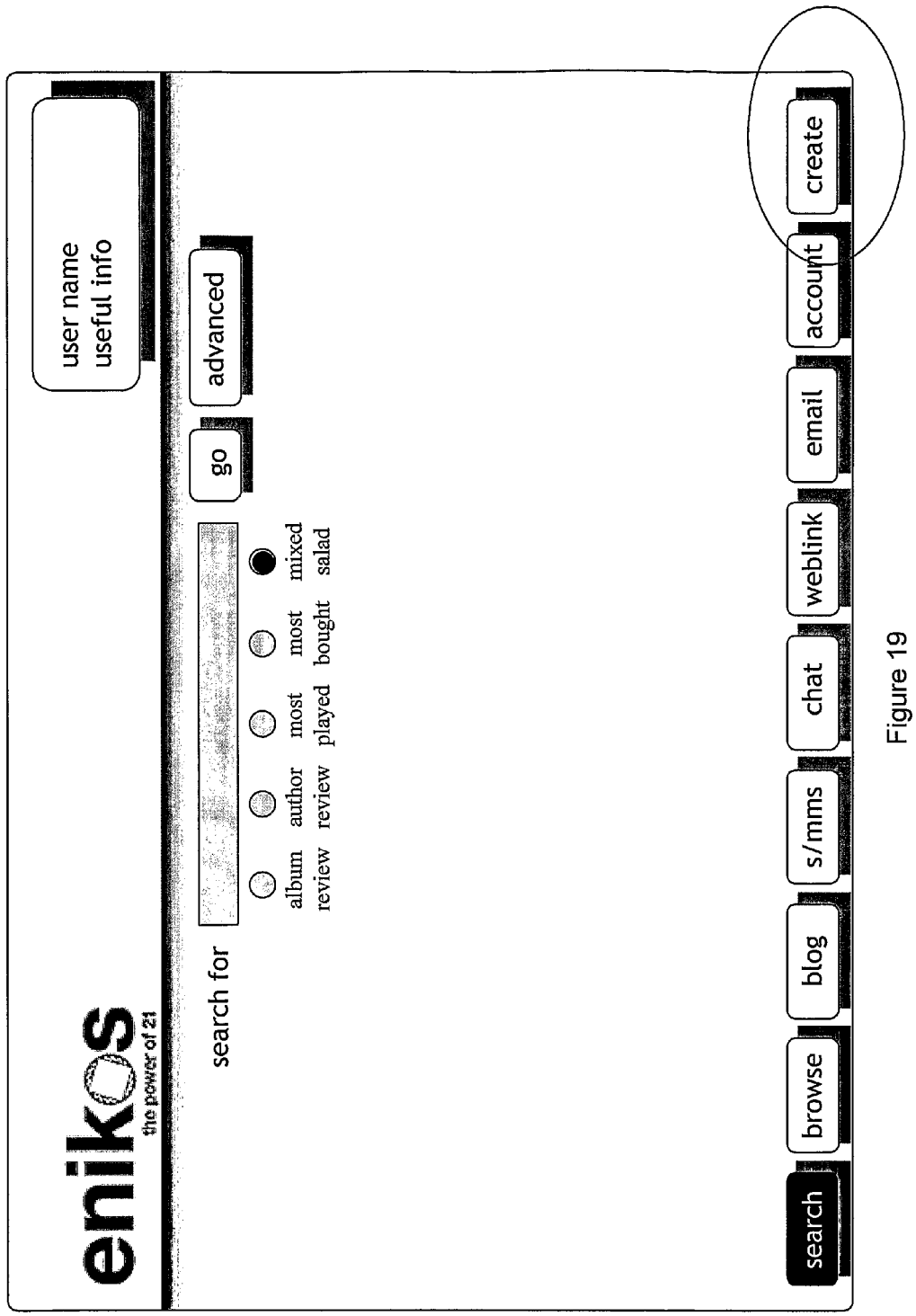
Figure 20:
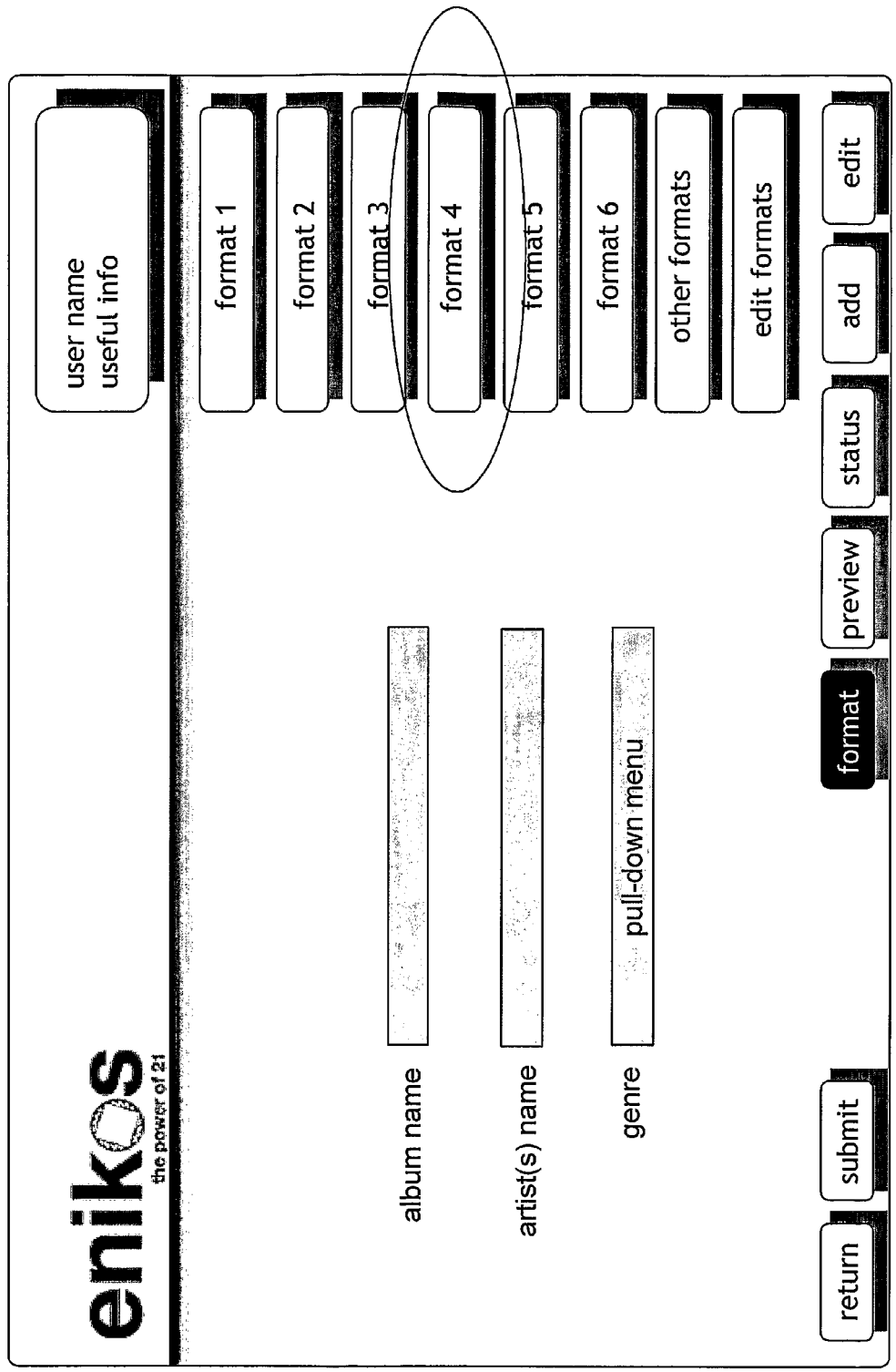

Another embodiment of the P2P client 102 includes the digital item creation tools, ie the creator module. This version of the client 102 is the same as the version described above, but also includes an additional access button "create", as shown in FIG. 19, that provides access to digital item creation interfaces of the tools, shown with reference to FIGS. 20 to 24. Selection of the create access button first causes the generation of a format interface, as shown in FIG. 20, where the name of a digital item can be included, together with the artist's name and a genre selected for the album of the item. The format of the digital item or the resources to be used in the digital item, can also be selected from a predetermined set of format selection buttons provided on the right of the interface. The formats each specify a respective format or structure for organising and/or presenting a digital item and its resources and metadata. The digital item creation interfaces include a set of creation buttons, at the bottom of each interface, that provide access to the different interfaces, such as a format, review, status, add, edit and finally a submit button to submit a digital item for registration.

Figure 21:
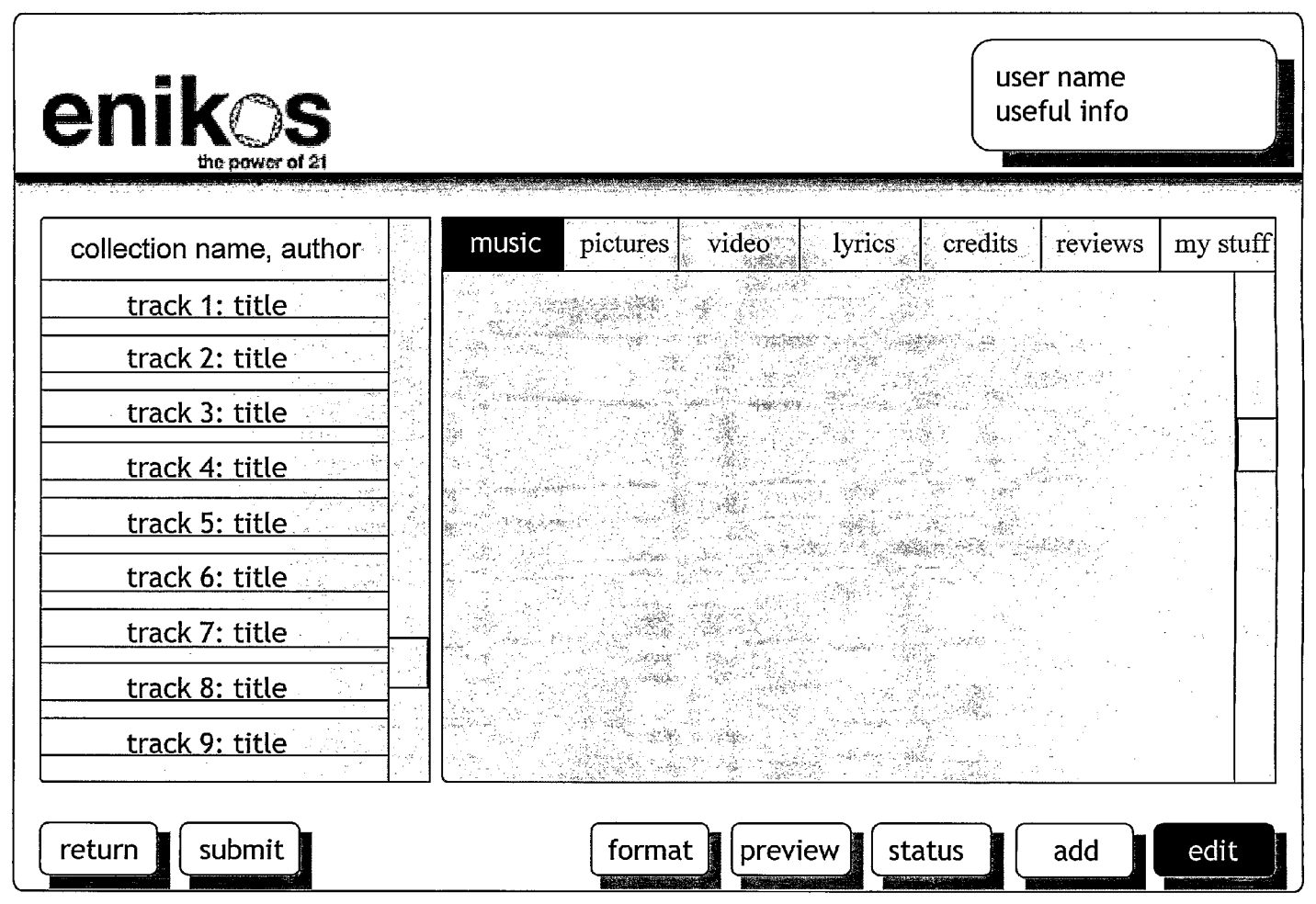
Figure 22:
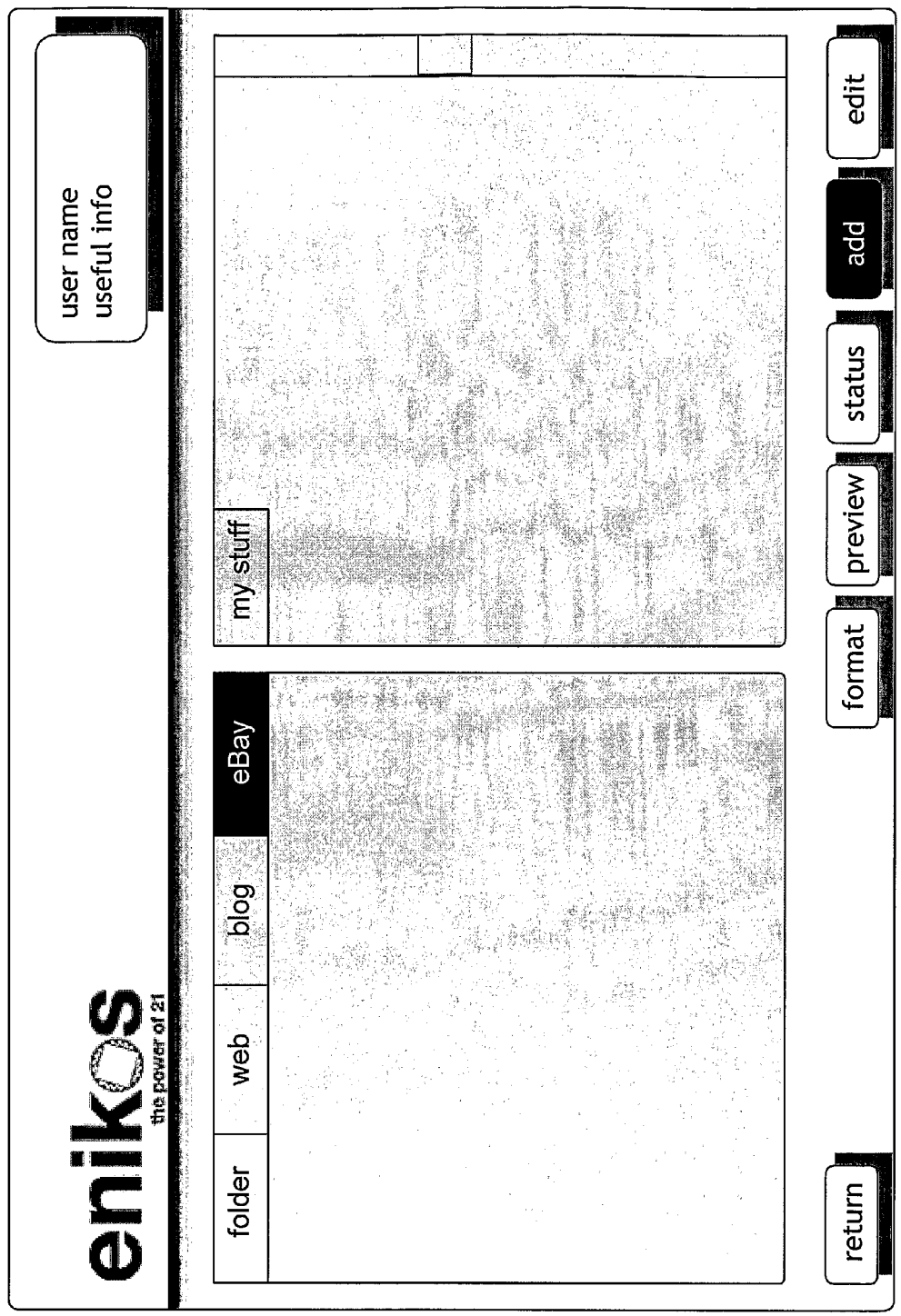

Selecting the edit creation button causes the generation of the item edit interface, as shown in FIG. 21, and allows content to be produced for the item, such as the music tracks, pictures, video, lyrics, credits, reviews and other author data. Content references for inclusion in the digital item can be dragged and dropped onto the main pane of the interface, underneath the content selection buttons. The track titles can be also adjusted and selected. Selection of the add creation button produces an interface, as shown in FIG. 22, that allows metadata and URIs to be entered for specific sections of an author specific content section. This can include data in relation to web sites, blog sites, eBay items for sale or content held in a local folder on the creator's computer system 110 (provided the content is uniquely identifiable and public access is provided). Selecting the status creation button generates an interface, as shown in FIG. 23, which displays a current status of the ranking levels for each of the ranking categories for digital items that have been created by the author.

The creator is able to include references and specific links to ecommerce sites, ie "affiliates", such as eBay, Amazon and iTunes, in order to promote content for sale on their sites. This enables an author to obtain an affiliate payment from the ecommerce sites, if a consuming user relies on the author's references and links to ultimately purchase the referenced content. The affiliate payments can be controlled by the transaction module 144 of the content distribution system 100.

Figure 24:
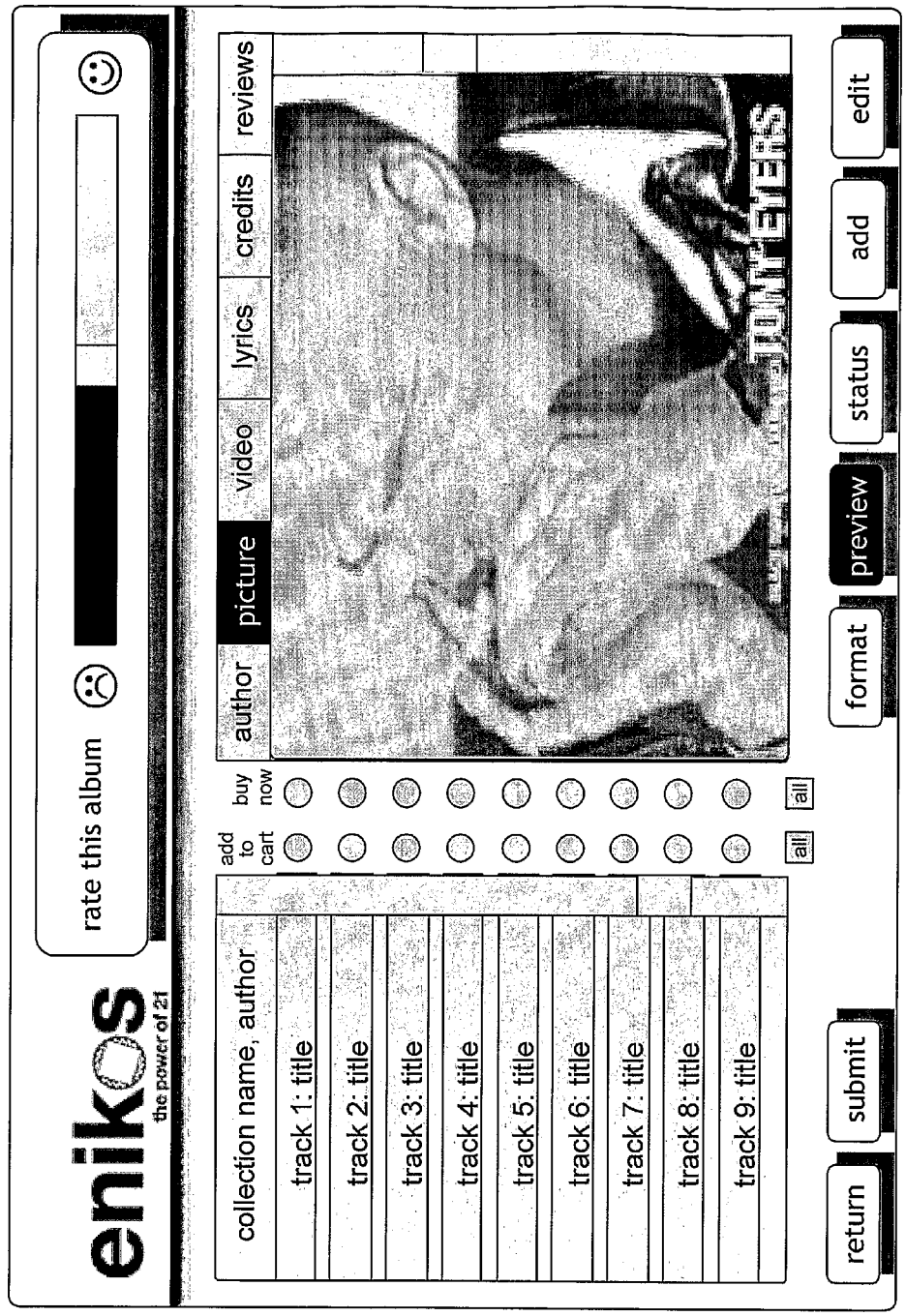

By selecting the preview creation button, the digital item, as it would be presented to a consumer user, can be accessed and used by the author to determine whether any further editing needs to be made, as shown in FIG. 24. Once the author is satisfied, then the digital item can be submitted by selecting the submit button, to commence the registration process of the content system 100.

The account interface, as described above with reference to FIG. 18, has the same account selection buttons for the basic P2P client 102, but for this version of the creator client 102 or 104, different information is presented to the user, ie the author. For example, when selecting the cart button, this causes additional information to be presented as to payments that have been received from other parties, and enables the author to redeem the amount of an account balance credit as cash or other products or services. Also, the payment select button produces additional interfaces that allow the author to specify how users can pay for digital item purchases or use. The selection of the library button presents the library interface, which in addition to showing digital items that can be downloaded, also shows digital items that have been posted by the client 102 or 104 to the content distribution system 100.

Figure 25:
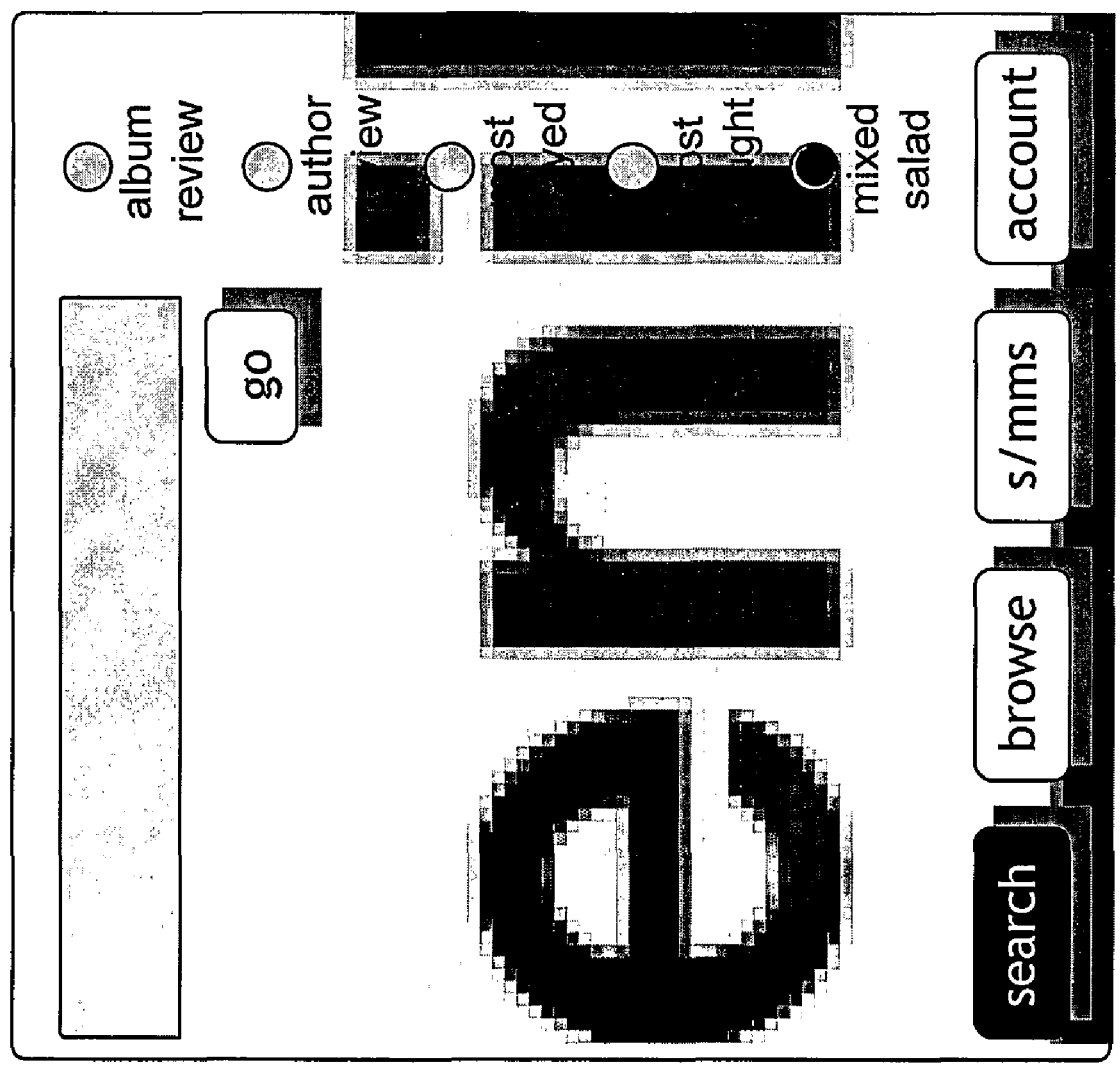
FIGS. 25 to 33 are diagrams of interfaces generated by a third embodiment of a client of the system.
Figure 26:
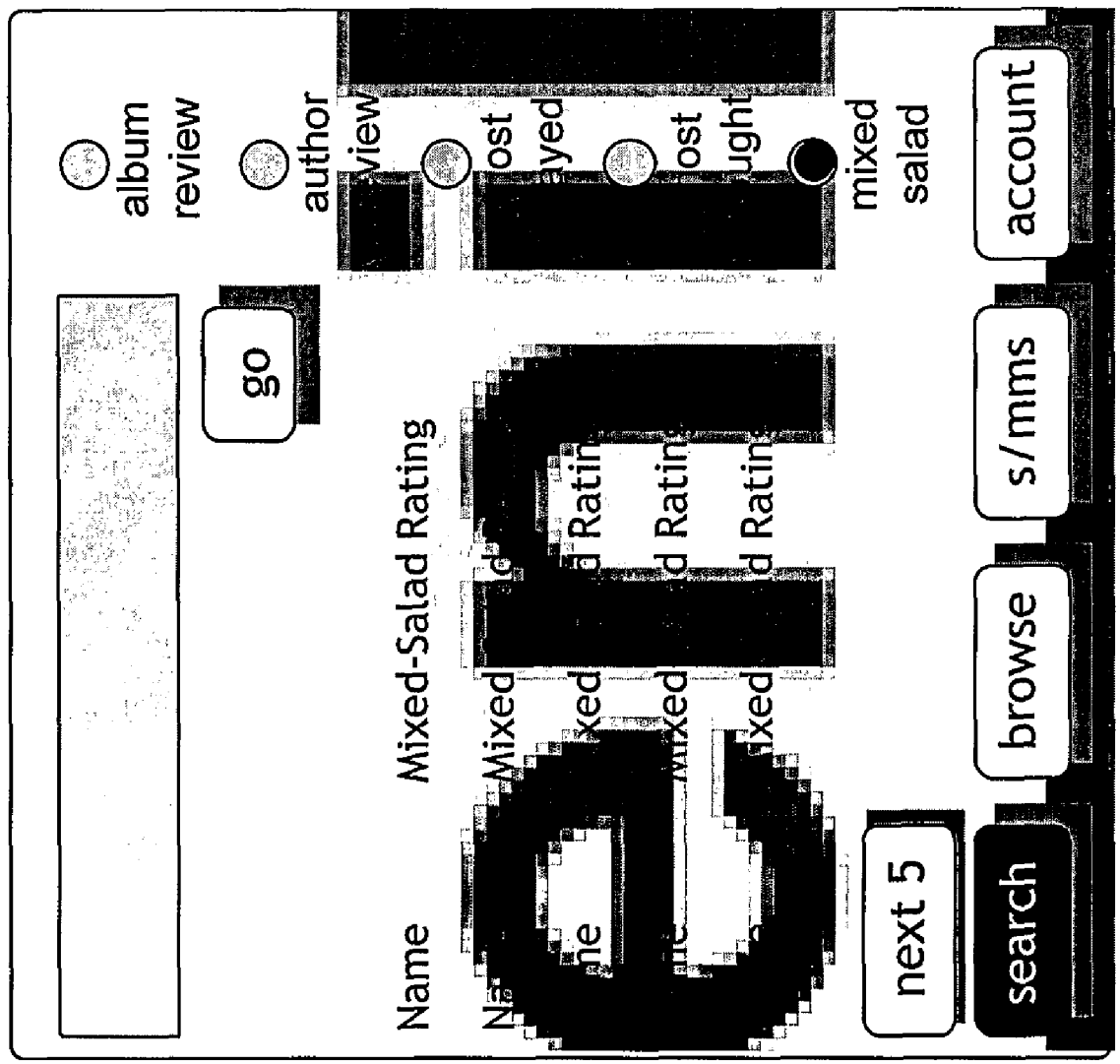
Figure 27:
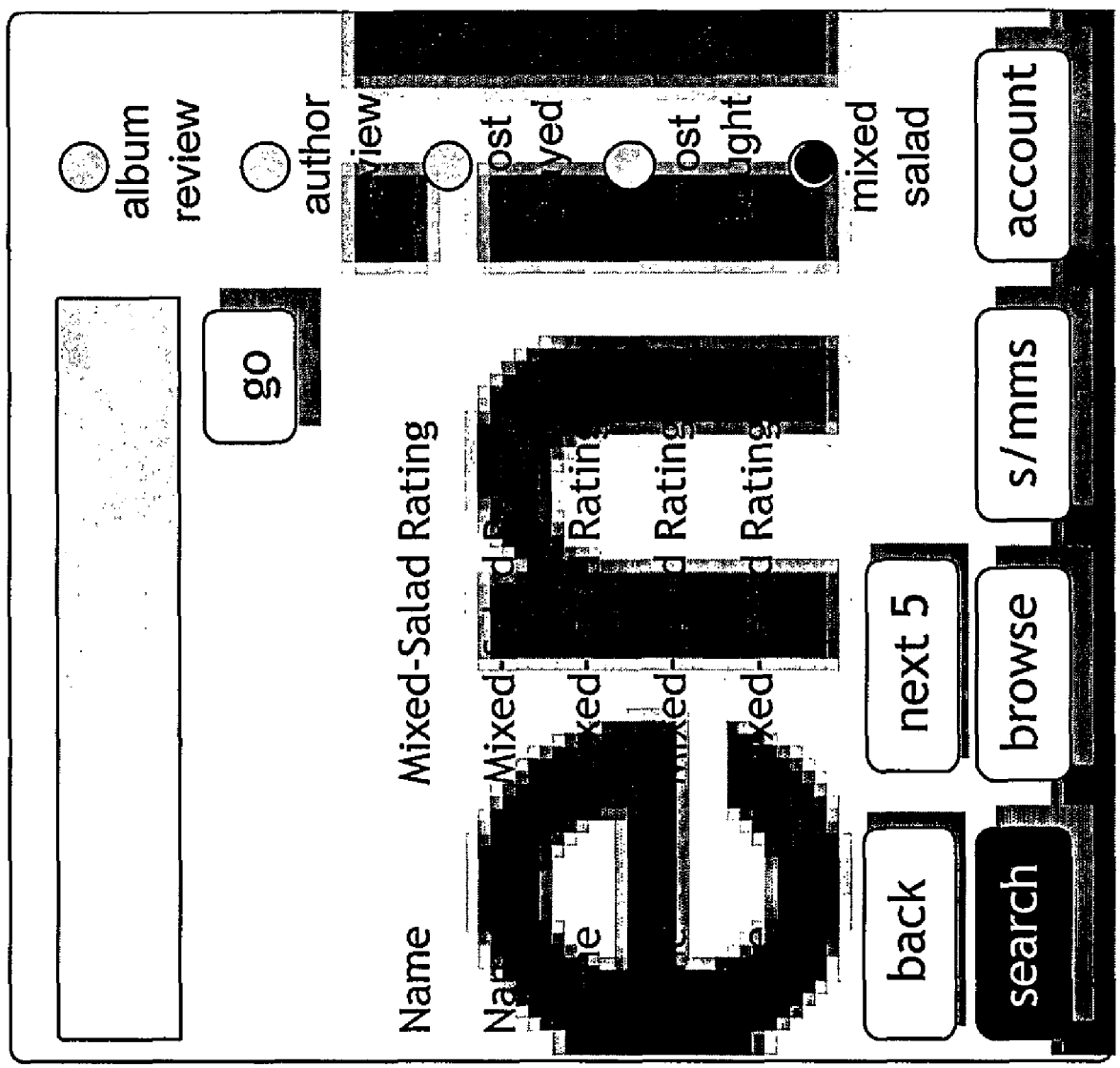
Figure 28:
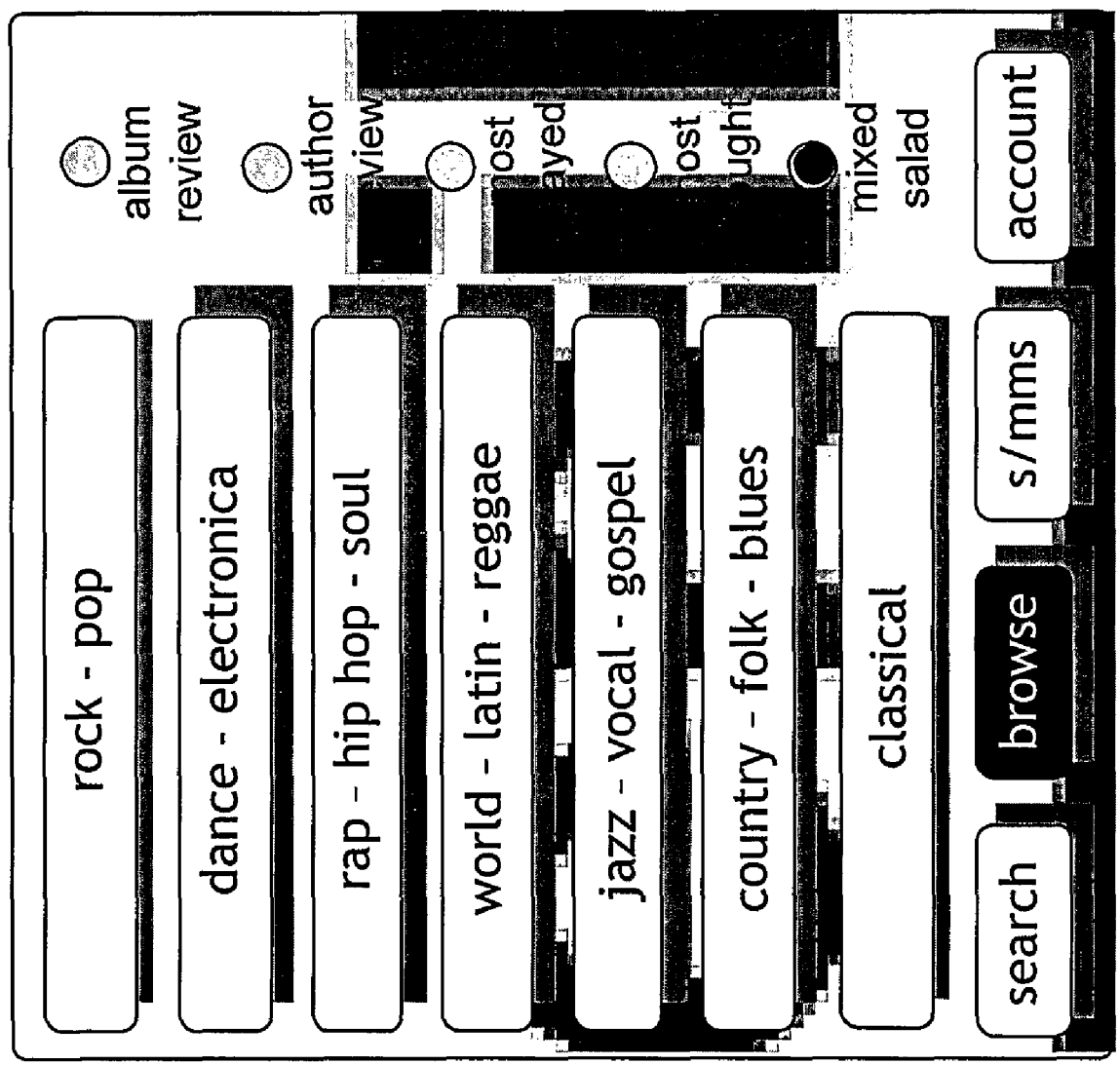
Figure 29:
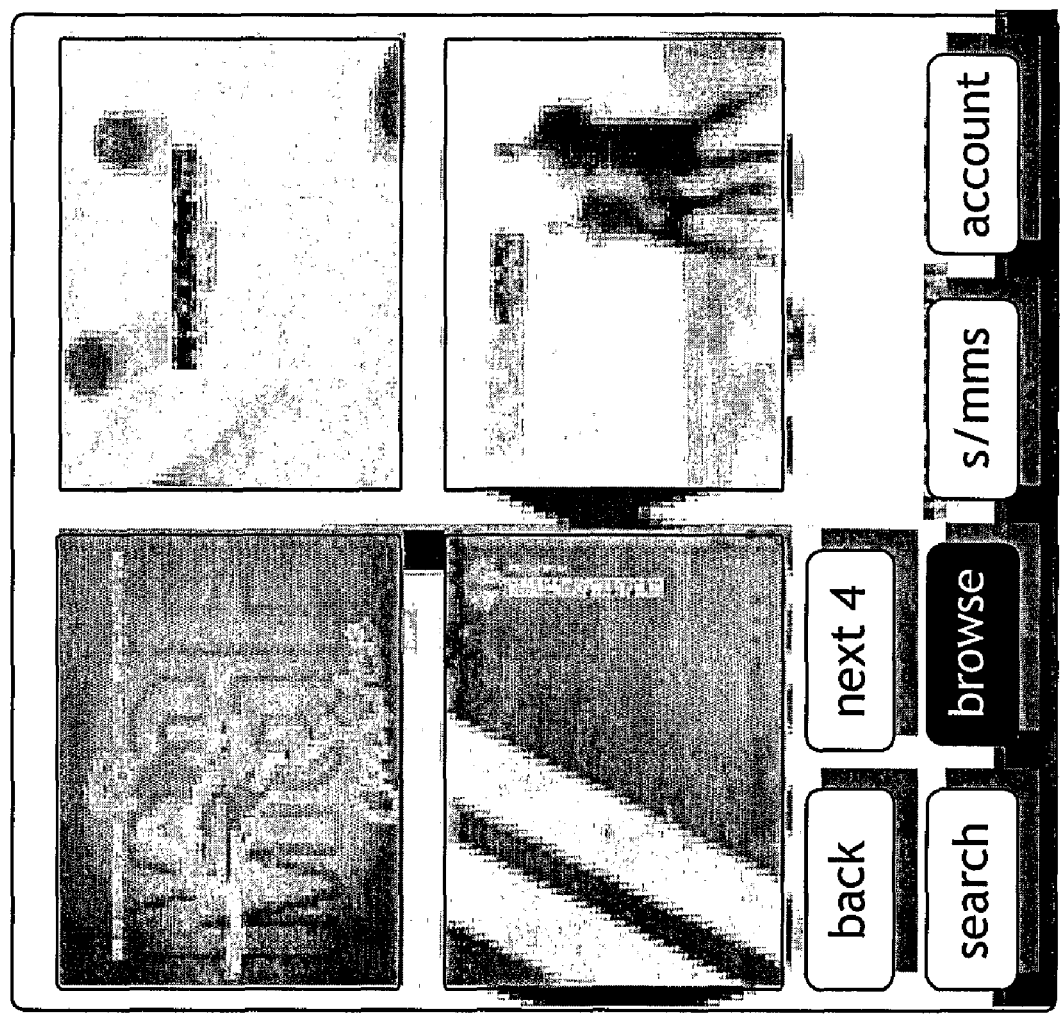
Figure 30:
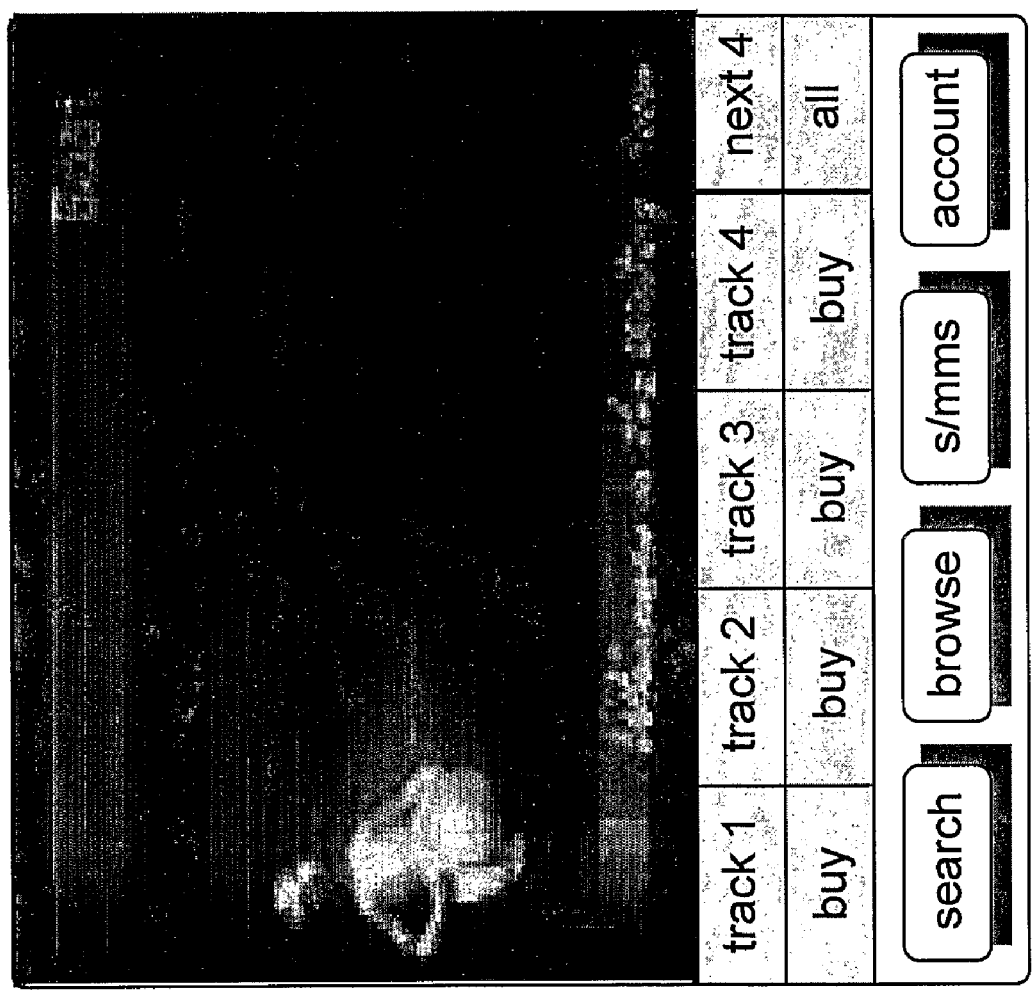
Figure 31:
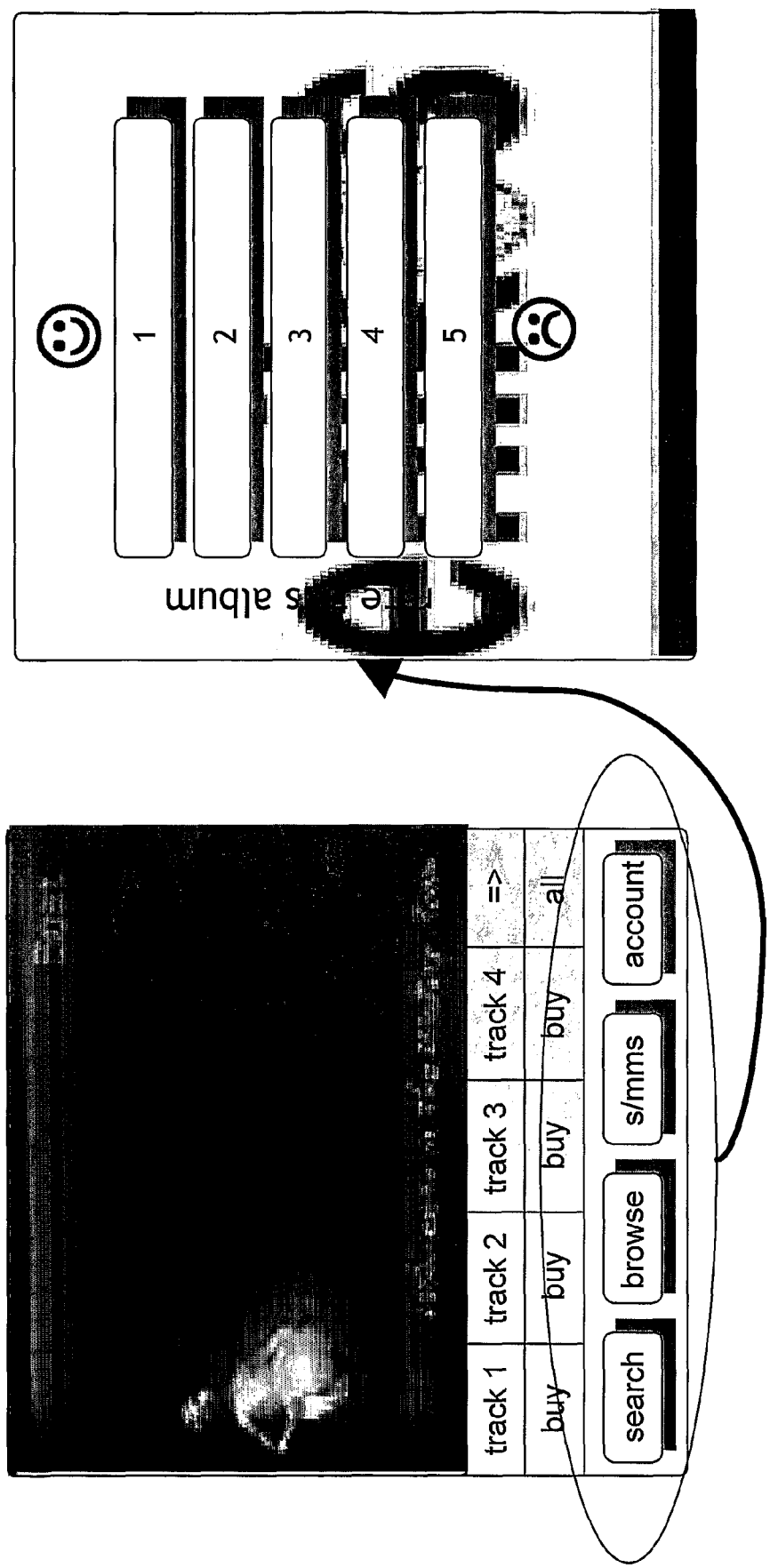
Figure 32:
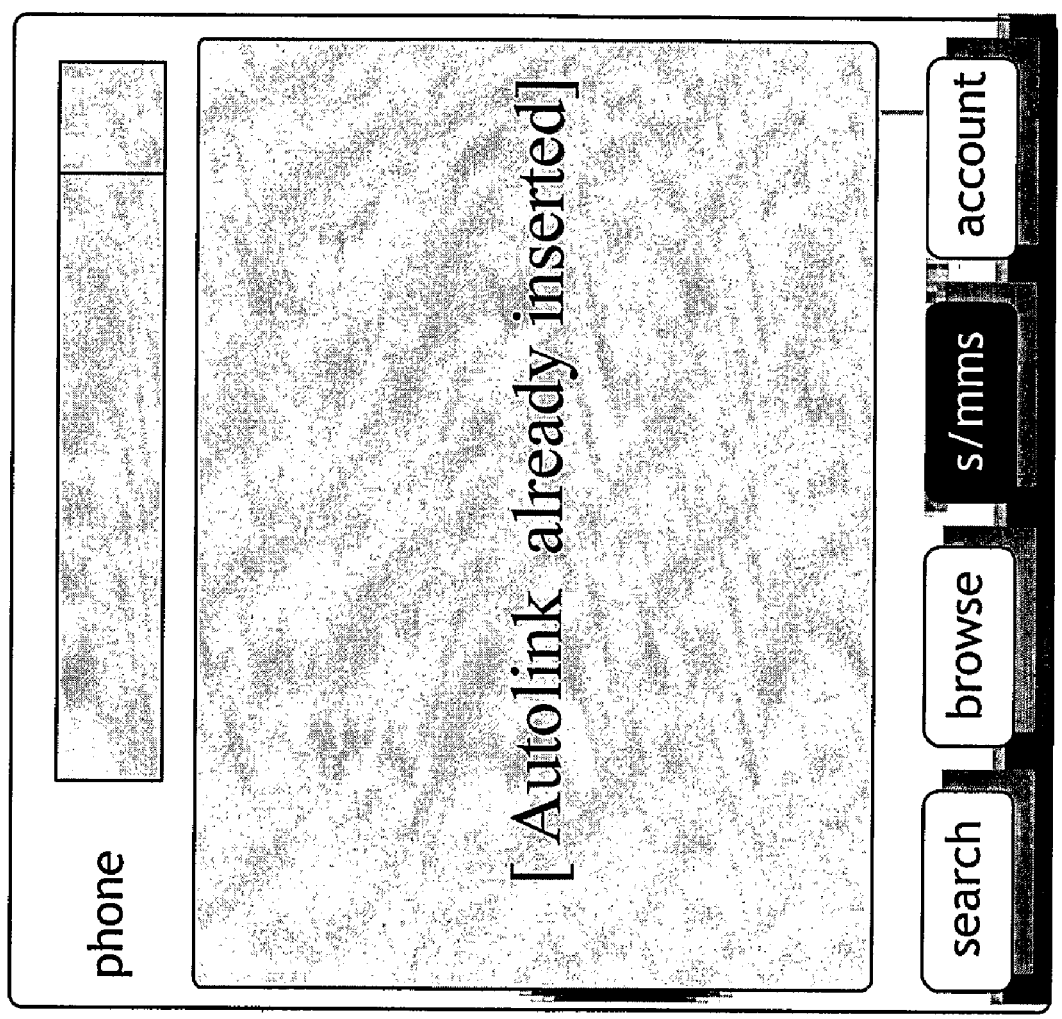
Figure 33:
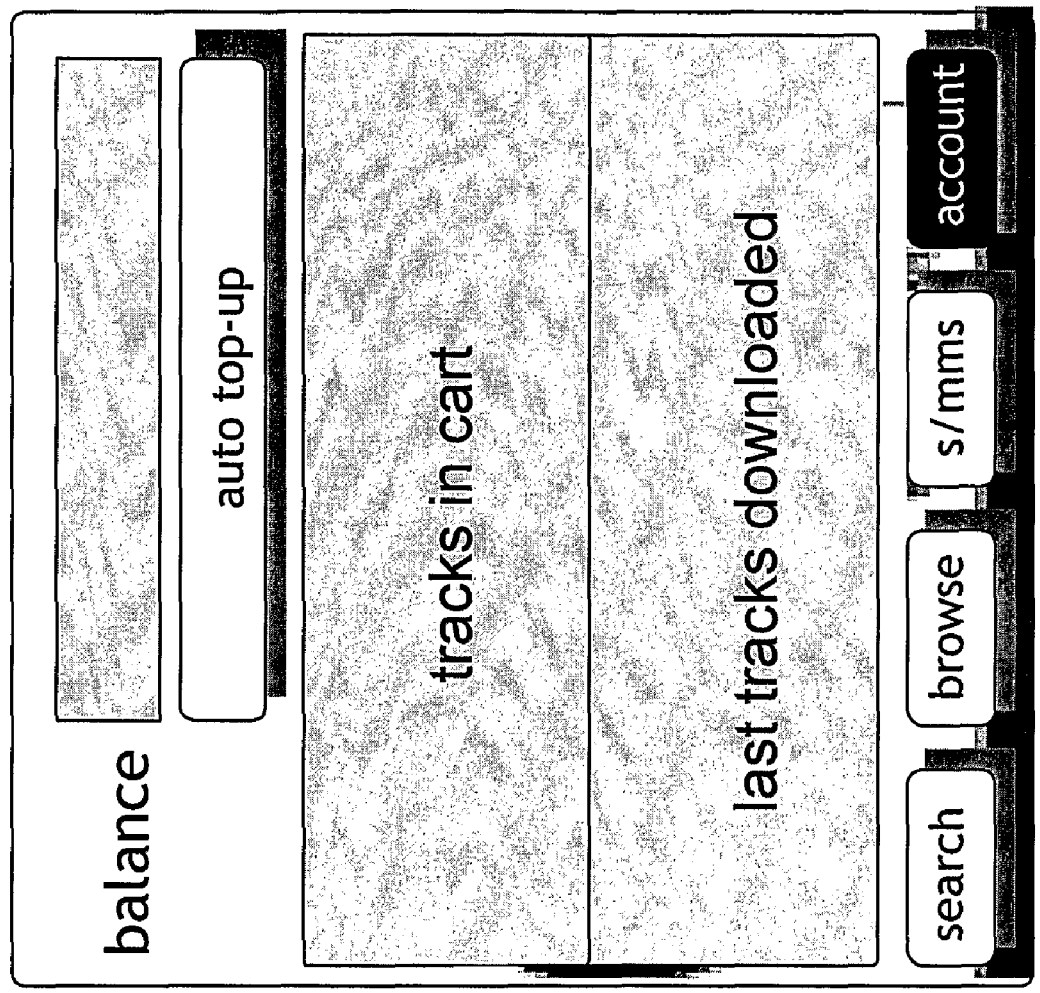

The content distribution system also includes a gateway server 120 that allows digital items to be accessed and served to users having a device that cannot run a P2P client 102, eg users with a PDA or mobile phone. The gateway server 120 maintains a version of the P2P client 102 and provides an interface for different devices to enable access and purchase of digital items. The gateway server 120 connects the control system 100 using a communications network 150 that supports the TCP/IP protocols. The version of the P2P client 102 maintained by the gateway 120 can be accessed as individual pages within a microbrowser of a PDA or a mobile phone. Alternatively a small device client can be downloaded to the small or handheld device to be executed thereon and communicate with the gateway server 120. The interfaces presented for both of these versions are shown in FIGS. 25 to 33. The interfaces each include access buttons, search, browse, S/MMS, or account. The search button provides access to a search interface, as shown in FIG. 25. This allows content to be searched and again ranked on the basis of the four ranking categories, or the mixed salad combination, as selected by a user. The results are returned according to the ranking level of the selected category, as shown in FIGS. 26 and 27. The browse button provides access to music genre selection buttons, as shown in FIG. 28. The browse results are presented as shown in FIG. 29, by rendering an image display for the user representing, and attached to a link for, each digital item. In addition to ranking on the basis of the ranking categories, sponsored rankings can also be purchased to increase the ranking level. Once a digital item is selected from the image link or a listing of search results, access to the item is presented, as shown in the interface of FIG. 30. The track buttons allow the first four tracks to be selected and the next four tracks to be presented for selection. On selecting a track, the track is played by a media player of the small or handheld device player. The track can also be bought by selecting a corresponding buy button. Also, all tracks can be bought by selecting an all button. Once the track has finished playing, a rating interface is presented, as shown in FIG. 31, on the right hand side. A review rating can therefore be selected for the track and submitted back to the server 120 and the content system 100 for use in future search results rankings. On selecting the S/MMS button, a selected digital item or track can be sent as an MMS (multimedia message service) message to another device, designated by a phone number, as shown in FIG. 32. Selecting an account button, presents an interface, as shown in FIG. 33, that shows the balance of a user's account, a balance "top-up" button for selection, tracks that are placed in a shopping cart, and tracks that have been historically downloaded. Selecting the "top-up" button instructs the transaction module 144 of the content system 100 to complete transactions to credit the account of the user of the device.

Many modifications will be apparent to those skilled in the art without departing from the scope of the present invention, as described herein with reference to the accompanying drawings. For example, although the specification describes a number of electronic processes being executed and controlled by software, those skilled in the art will readily appreciate that a number of these technical processes can be executed solely by dedicated electronic circuits, such an ASIC or FPGA.

What is claimed is:

1. A peer-to-peer (P2P) digital content distribution system, said system comprising:
   a plurality of programmed processors configured to provide:
   a registration module executed by at least one of said processors for receiving registration data for a digital item accessible, on a P2P communications network, using a P2P digital item client on a first device, wherein said digital item includes a structured digital object including standard representation, identification, metadata and also by reference content for download and other content accessible by said second device without payment;

an activity module executed by at least one of said processors for receiving on a second device a request for content of said digital item from said P2P digital item client; and a transaction module executed by at least one of said processors for registering download of said content to said second device, for processing payment transactions with said second device, and for processing remuneration transactions with at least said first device, wherein at least said digital item client on said first device includes a creator module for authoring digital items, said creator module generating interfaces for:
  (i) adding and editing of content for a digital item;
  (ii) editing and establishing a digital item declaration for said digital item; and
  (iii) adding buy data for said digital item by including resources or metadata in said digital item declaration.

2. A content distribution system as claimed in claim 1, wherein said digital item references said content for access by said second device without payment, such as by streaming.

3. A content distribution system as claimed in claim 1, wherein said remuneration transactions include storing credit data for a user of said first device.

4. A content distribution system as claimed in claim 3, wherein said credit data represents credits that can be used for payment of requested content.

5. A content distribution system as claimed in claim 3, wherein said remuneration transactions include storing said credit data representing a percentage of remuneration for said user of said first device, and storing credit data representing a percentage of said remuneration for a publisher or creator of said content.

6. A content distribution system as claimed in claim 3, wherein said digital item references said content available on a site of an affiliate, and said remuneration transactions include storing said credit data representing a payment from said affiliate.

7. A content distribution system as claimed in claim 1, wherein said digital item and digital item declaration complies with MPEG-21.

8. A content distribution system as claimed in claim 1, including a search module for generating a search interface to a search engine for processing search queries in relation to content on said network, and providing responses with references to digital items.

9. A content distribution system as claimed in claim 8, wherein said responses are ranked based on a ranking criteria selected by a user of said search interface, and the ranking criteria includes at least one of:
  (i) reviews for a digital item;
  (ii) reviews for an author of a digital item;
  (iii) level of access of a digital item; and
  (iv) level of purchase of a digital item.

10. A content distribution system as claimed in claim 1, wherein the digital item includes buy data used to generate a buy button for said content, which on selection by a user on said second device, generates said request.

11. A content distribution system as claimed in claim 1, wherein said content is downloaded from a location referenced, directly or indirectly, by said digital item.

12. A content distribution system as claimed in claim 1, wherein said digital item references an unauthorized copy of said content and includes buy data for an authorized copy of said content.

13. A content distribution system as claimed in claim 1, wherein said payment transactions include obtaining payment from the user of said second device for said remuneration.

14. A content distribution system as claimed in claim 1, wherein said digital item client is adapted to place a number of digital items on said P2P network, and said digital items include or reference one or more content elements, and the content elements are public domain, unauthorized, or authorized elements.

15. A content distribution system as claimed in claim 1, wherein said client is adapted to present advertising information based on advertising data served to said client, said advertising data being based on demographic data stored by said system for a user of said client.

16. A content distribution system as claimed in claim 1, wherein said digital item and digital item declaration are in the extensible markup language (XML).

17. A peer-to-peer (P2P) digital content distribution process, said process comprising:
  receiving registration data for a digital item accessible, on a P2P communications network, using a P2P digital item client on a first device;
  receiving on a second device a request for content of said P2P digital item digital item from said client, wherein said digital item includes a structured digital object including standard representation, identification, metadata and also by reference content for download and other content accessible by said second device without payment;
  registering download of said content to said second device;
  processing payment transactions with said second device; and
  processing remuneration transactions with at least said first device,
  wherein at least said digital item client on said first device includes a creator module for authoring digital items, said creator module generating interfaces for:
    (i) adding and editing of content for a digital item;
    (ii) editing and establishing a digital item declaration for said digital item; and
    (iii) adding buy data for said digital item by including resources or metadata in said digital item declaration.

18. A content distribution process as claimed in claim 17, including acceptance of registration data when a user of said first device has contributed content, metadata or a digital item declaration for said digital item.

* * * * *